United States Patent
Miura et al.

(10) Patent No.: US 10,217,360 B2
(45) Date of Patent: Feb. 26, 2019

(54) INFORMATION NOTIFICATION METHOD, INFORMATION NOTIFICATION SYSTEM, AND RECORDING MEDIUM FOR USER WHO PARKS VEHICLE

(71) Applicant: Panasonic Intellectual Property Corporation of America, Torrance, CA (US)

(72) Inventors: Kouji Miura, Osaka (JP); Ryo Ishida, Osaka (JP); Soichi Kimura, Osaka (JP); Chisato Yamashita, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 209 days.

(21) Appl. No.: 14/877,803

(22) Filed: Oct. 7, 2015

(65) Prior Publication Data

US 2016/0111003 A1    Apr. 21, 2016

Related U.S. Application Data

(60) Provisional application No. 62/064,175, filed on Oct. 15, 2014.

(30) Foreign Application Priority Data

Jul. 15, 2015    (JP) ................ 2015-141026

(51) Int. Cl.
G08G 1/14        (2006.01)
G01C 21/36    (2006.01)

(52) U.S. Cl.
CPC ......... *G08G 1/144* (2013.01); *G01C 21/3685* (2013.01); *G01C 21/3697* (2013.01); *G08G 1/146* (2013.01)

(58) Field of Classification Search
CPC ............ G01C 21/3685; G01C 21/3697; G08G 1/144; G08G 1/146

(Continued)

(56) References Cited

U.S. PATENT DOCUMENTS

2002/0109610 A1\* 8/2002 Katz ..................... G07B 15/02
340/932.2
2008/0186166 A1\* 8/2008 Zhou ..................... G01S 5/0027
340/539.13

(Continued)

FOREIGN PATENT DOCUMENTS

JP    2003-272001    9/2003
JP    2009-264765    11/2009

*Primary Examiner* — Omer S Khan
(74) *Attorney, Agent, or Firm* — Greenblum & Bernstein, P.L.C.

(57) ABSTRACT

An information notification method includes obtaining a parking time limit during which a user is allowed to continuously park a vehicle at a parking lot, measuring a travel time required for the user to move from the parking lot to a destination, obtaining a round trip time required for the user to make a round trip between the destination and the parking lot, calculating a remaining time during which the user is allowed to stay at the destination by subtracting, from the parking time limit, the round trip time and an elapsed time measured from when the user has reached the destination, determining whether the remaining time is less than or equal to a threshold value preset to zero or greater, and notifying the user that the remaining time is short if it is determined that the remaining time is less than or equal to the threshold value.

2 Claims, 15 Drawing Sheets

(58) Field of Classification Search
USPC .................................................. 340/932.2
See application file for complete search history.

(56) References Cited

U.S. PATENT DOCUMENTS

| | | | |
|---|---|---|---|
| 2008/0243331 A1* | 10/2008 | Kato | B60L 11/123 |
| | | | 701/29.5 |
| 2009/0005969 A1* | 1/2009 | Tamura | G01C 21/3423 |
| | | | 701/533 |
| 2012/0095790 A1* | 4/2012 | Stefik | G06Q 10/02 |
| | | | 705/5 |
| 2014/0070945 A1* | 3/2014 | Dave | G06Q 10/109 |
| | | | 340/540 |
| 2016/0071172 A1* | 3/2016 | Shangguan | G06Q 30/0284 |
| | | | 705/13 |

* cited by examiner

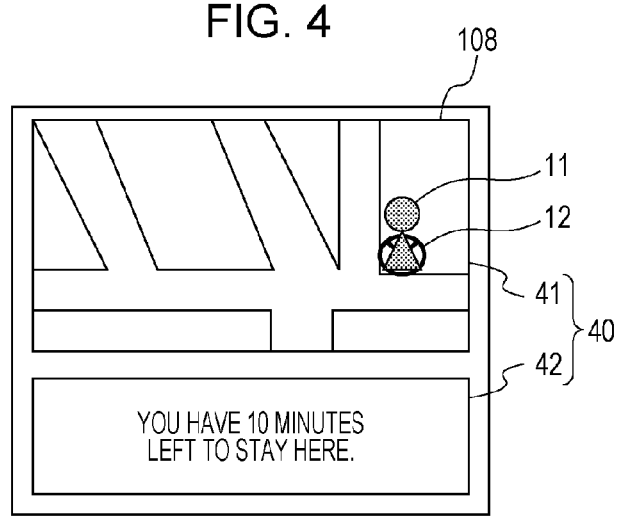
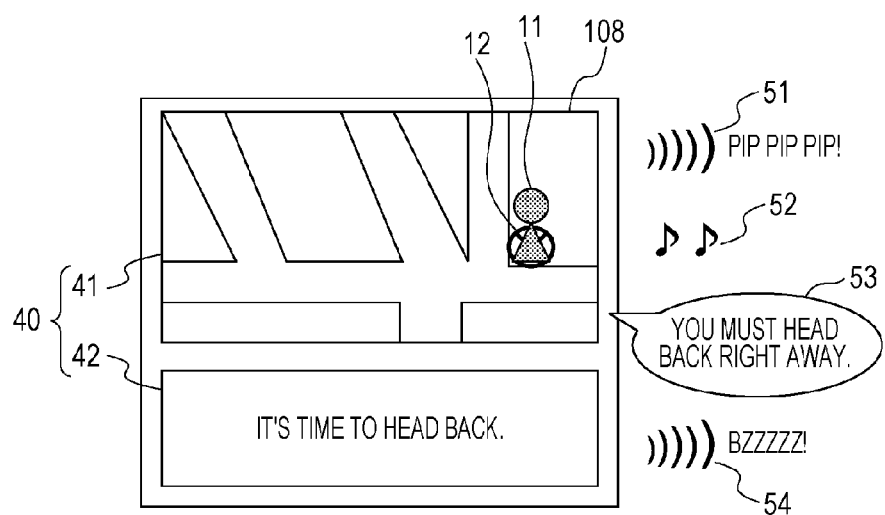

| | 1501 | 1502 | 1503 | 1504 | 1505 |
|---|---|---|---|---|---|
| | DAY OF WEEK | TIME ZONE | WEATHER | TRAVEL SPEED (m/min) | TRAVEL TIME (min) |
| | Mon | 12 TO 15 | SHINE | 60 | 6 |
| | Sat | 18 TO 21 | RAIN | 40 | 9 |
| | ... | ... | ... | ... | ... |
| | ... | ... | ... | ... | ... |

INFORMATION NOTIFICATION METHOD, INFORMATION NOTIFICATION SYSTEM, AND RECORDING MEDIUM FOR USER WHO PARKS VEHICLE

BACKGROUND

1. Technical Field

The present disclosure relates to an information notification method, an information notification system, and a recording medium.

2. Description of the Related Art

Technologies for notifying a user who parks their car at a parking lot of information, such as a parking fee, have been developed and are described in, for example, Japanese Unexamined Patent Application Publication No. 2003-272001 (hereinafter referred to as "Patent Literature (PTL) 1") and Japanese Unexamined Patent Application Publication No. 2009-264765 (hereinafter referred to as "PTL 2").

SUMMARY

Further improvements are required for PTL 1 and PTL 2.

In one general aspect, the techniques disclosed here feature an information notification method for use in an information notification system including a navigation system mounted in a vehicle and a mobile device of a user is provided, where the navigation system guides the user to a destination and a parking lot and the mobile device is capable of communicating with the navigation system. The method includes obtaining a parking time limit during which the user is allowed to continuously park the vehicle at the parking lot, measuring a travel time required for the user to move from the parking lot to the destination, obtaining a round trip time required for the user to make a round trip between the destination and the parking lot, calculating a remaining time during which the user is allowed to stay at the destination by subtracting, from the parking time limit, the round trip time and an elapsed time measured from when the user has reached the destination, determining whether the remaining time is less than or equal to a threshold value preset to a value that is greater than or equal to zero, and notifying the user that the remaining time is short if it is determined that the remaining time is less than or equal to the threshold value.

According to the present disclosure, the information notification method can be further improved.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 illustrates a notification screen displayed on a display of a mobile device;

FIG. 5 illustrates a notification screen displayed on a display of a mobile device;

FIG. 15 illustrates an example of the data structure of history information stored in a measurement history storage unit;

DETAILED DESCRIPTION

Figure 1:
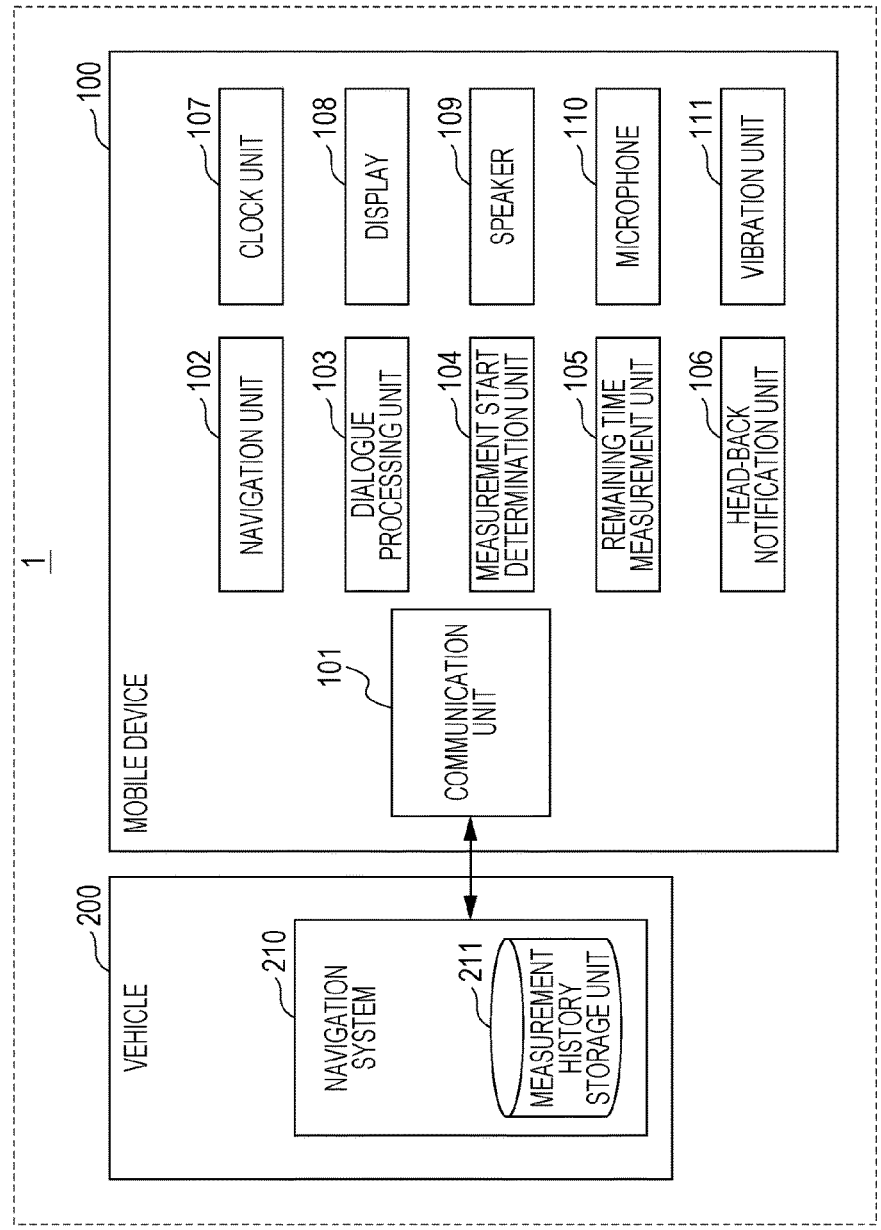
FIG. 1 is a block diagram of the configuration of an information notification system according to a first exemplary embodiment.

Underlying Knowledge Forming Basis of the Present Disclosure

A key point of an aspect of the present disclosure is described first.

PTL 1 describes a technology for outputting information regarding a parking fee to a mobile information technology device carried by a user using a parking start time, a parking fee per unit time, and the current time. A map indicating the present position of the user and a route to the parking lot, the current parking fee, and the remaining time for which the user has paid are displayed on a display unit of the mobile information technology device (refer to FIG. 13 of PTL 1).

As described above, according to PTL 1, the user can be notified of the remaining time for which the user has paid. However, PTL 1 does not notify a user of a point in time at which the user should start moving from the current location to the parking lot so that the currently displayed parking fee remains unchanged.

PTL 2 describes the following technology. That is, a travel time required for a user to move between the location of a mobile terminal carried by the user and the location at which the vehicle is parked is calculated. If the calculated travel time is shorter than a fee charging cycle, the information about the time remaining until next due time is sent to the mobile terminal. However, if the calculated travel time is longer than the fee charging cycle, the information about the additional fee at the next due time is sent to the mobile terminal.

The information is sent to the mobile terminal so that the user can make it on time with a slight margin (refer to Paragraph [0010] of PTL 2). Accordingly, unlike the technology of PTL 1, the user can determine at which timing the user should head back to their vehicle (refer to Paragraph [0011] of PTL 2).

For example, when the destination is a large shopping mall and if a user buys a large number of items, the user may need to wait in a long checkout line. In such a case, although the user may want to know at which time the user should leave the current location for the parking lot, the technologies of PTLs 1 and 2 do not meet such a demand of the user.

In addition, according to PTL 2, the travel time is calculated by dividing the distance between the location of the mobile terminal and the location of the parking lot by the average walking speed of a human (refer to Paragraph [0010] of PTL 2). Accordingly, if the user cannot move at the average walking speed due to, for example, a people jam or a weather condition, it is difficult for the technology of PTL 2 to calculate an accurate time required.

To address the above-described issues, the present inventor conceived of the following aspects of the disclosure.

According to an aspect of the present disclosure, an information notification method for use in an information notification system including a navigation system mounted in a vehicle and a mobile device of a user is provided. The navigation system guides the user to a destination and a parking lot, and the mobile device is capable of communicating with the navigation system. The method includes obtaining a parking time limit during which the user is allowed to continuously park the vehicle at the parking lot, measuring a travel time required for the user to move from the parking lot to the destination, obtaining a round trip time required for the user to make a round trip between the destination and the parking lot, calculating a remaining time during which the user is allowed to stay at the destination by subtracting, from the parking time limit, the round trip time and an elapsed time measured from when the user has reached the destination, determining whether the remaining time is less than or equal to a threshold value preset to a value that is greater than or equal to zero, and notifying the user that the remaining time is short if it is determined that the remaining time is less than or equal to the threshold value.

According to the aspect, if it is determined that the remaining time is less than or equal to the threshold value, the user is notified that the remaining time is less than or equal to the threshold value. The threshold value is preset to a value that is greater than zero. Thus, according to the present aspect, the user can be prenotified before the remaining time reaches zero and, thus, the user should leave the destination. Accordingly, the user can prepare for departure from the destination.

According to the above-described aspect, for example, in obtaining a round trip time, a value may be obtained by doubling the travel time obtained in measuring a travel time as the round trip time. In this aspect, the value obtained by doubling the travel time required for the user to move from the parking lot to the destination serves as the round trip time required for the user to make a round trip between the destination and the parking lot. That is, a value obtained by doubling the actual travel time required for the user to move is used as the round trip time to calculate the allowed staying time. As a result, according to the present aspect, since an actual travel time of the user is used, the allowed staying time can be accurately calculated.

According to the above-described aspect, for example, the information notification system may further include a measurement history storage unit that stores a measured length of time measured when at least one of the user and a person other than the user moves from the destination to the parking lot. In obtaining a round trip time, a value is obtained by summing the travel time and the measured length of time stored in the non-transitory recording medium as the round trip time.

According to the aspect, a value obtained by summing the measured length of time measured when at least one of the user and a person other than the user actually moves from the destination to the parking lot and the travel time serves as the round trip time. Thus, according to the present aspect, a travel time required for at least one of the user and a person other than the user actually moves from the destination to the parking lot is used to calculate the allowed staying time. As a result, since the actual travel time is used, the allowed staying time can be accurately calculated.

According to the above-described aspect, for example, the information notification method may further include obtaining environment information indicating surrounding conditions when the user moves from the parking lot to the destination. The environment information obtained when the measured length of time is measured may be stored in the measurement history storage unit in association with the measured length of time. In obtaining a round trip time, a value may be obtained as the round trip time by summing the travel time and the measured length of time stored in the measurement history storage unit in association with the obtained environment information.

According to the aspect, the environment information indicating surrounding conditions when the user moves from the parking lot to the destination is acquired. The environment information detected when the measured length of time is obtained may be stored in the measurement history storage unit in association with the measured length of time. A value is obtained as the round trip time by summing the travel time and the measured length of time stored in the measurement history storage unit in association with the obtained environment information. Thus, according to the present aspect, the travel time and the measured length of time corresponding to the same environment information are used to calculate the allowed staying time. As a result, since the environment information is the same, the allowed staying time can be accurately calculated.

According to the above-described aspect, for example, the information notification method may further include calculating a travel speed of the user when the user moves from the parking lot to the destination. A travel speed of the person when the measured length of time is measured may be stored in the measurement history storage unit in association with the measured length of time. In obtaining a round trip time, a value is obtained as the round trip time by summing the travel time and the measured length of time stored in the measurement history storage unit in association with the calculated travel speed.

According to the aspect, a travel speed of the user when the user moves from the parking lot to the destination is calculated. A travel speed of the person when the measured length of time is measured is stored in the measurement history storage unit in association with the measured length of time. A value is obtained as the round trip time by summing the travel time and the measured length of time stored in the measurement history storage unit in association with the calculated travel speed. Thus, according to the present aspect, the measured length of time corresponding to the same travel speed is used to calculate the allowed staying time. As a result, since the travel speed is the same, the allowed staying time can be accurately calculated.

According to the above-described aspect, for example, the information notification method may further include obtaining attribute information regarding the parking lot indicating attributes of the parking lot and determining, on the basis of the obtained attribute information, whether in determining whether the remaining time is less than or equal to a threshold value, only a first predetermined value is used as the threshold value or both the first predetermined value and a second predetermined value other than the first predetermined value are used as the threshold value. In determining whether the remaining time is less than or equal to a threshold value, the determined threshold value may be used.

According to the aspect, the attribute information regarding the parking lot indicating attributes of the parking lot is acquired. In determining whether the remaining time is less than or equal to a threshold value, it is determined, on the basis of the obtained attribute information, whether only a first predetermined value is used as the threshold value or both the first predetermined value and a second predetermined value other than the first predetermined value are used as the threshold value. In determining whether the remaining time is less than or equal to a threshold value, the determined threshold value may be used. Thus, according to the present aspect, prior notification is provided to the user using the attribute of the parking lot a plurality of times. As a result, a plurality of number of prior notifications in accordance with the attribute of the parking lot can be provided to the user.

According to the above-described aspect, for example, in notifying the user that the remaining time is short, a first device may be used to notify the user if only the first predetermined value is used as the threshold value, and a second device different from the first device may be used if both the first predetermined value and the second predetermined value are used as the threshold value.

According to the aspect, in notifying the user that the remaining time is short, if only the first predetermined value is used as the threshold value, notification is provided to the user using the first device. However, if both the first predetermined value and the second predetermined value are used as the threshold value, the notification is provided to the user using a second device different from the first device. That is, different devices for notification are used depending on whether the prior notification is provided to the user once or twice. Thus, according to the present aspect, if, for example, the second device that consumes less power than the first device is used, an excessive increase in power consumption caused by two prior notification processes can be avoided.

According to another aspect of the present disclosure, an information notification system is provided. The information notification system includes a navigation system mounted in a vehicle, where the navigation system guides a user to a destination and a parking lot, and a mobile device carried by the user and capable of communicating with the navigation system.

The mobile device includes a processor and a non-transitory recording medium having a computer program therein, and the computer program causes the processor to perform obtaining a parking time limit during which the user is allowed to continuously park the vehicle at the parking lot, measuring a travel time required for the user to move from the parking lot to the destination, obtaining a round trip time required for the user to make a round trip between the destination and the parking lot, calculating a remaining time during which the user is allowed to stay at the destination by subtracting, from the parking time limit, the round trip time and an elapsed time measured from when the user has reached the destination, determining whether the remaining time is less than or equal to a threshold value preset to a value that is greater than or equal to zero, and notifying the user that the remaining time is short if it is determined that the remaining time is less than or equal to the threshold value.

According to still another aspect of the present disclosure, a non-transitory computer-readable recording medium is provided. The recording medium stores a computer program for use in an information notification system including a navigation system mounted in a vehicle and a mobile device of a user, where the navigation system guides the user to a destination and a parking lot and the mobile device is capable of communicating with the navigation system. The computer program causes a processor of the mobile device to perform:

obtaining a parking time limit during which the user is allowed to continuously park the vehicle at the parking lot, measuring a travel time required for the user to move from the parking lot to the destination, obtaining a round trip time required for the user to make a round trip between the destination and the parking lot, calculating a remaining time during which the user is allowed to stay at the destination by subtracting, from the parking time limit, the round trip time and an elapsed time measured from when the user has reached the destination, determining whether the remaining time is less than or equal to a threshold value preset to a value that is greater than or equal to zero, and notifying the user that the remaining time is short if it is determined that the remaining time is less than or equal to the threshold value.

Exemplary Embodiments

Exemplary embodiments of the present disclosure are described below with reference to the accompanying drawings. Note that in the drawings, the same reference symbol is used for convenience to indicate elements which are the same.

First Exemplary Embodiment

Figure 2:
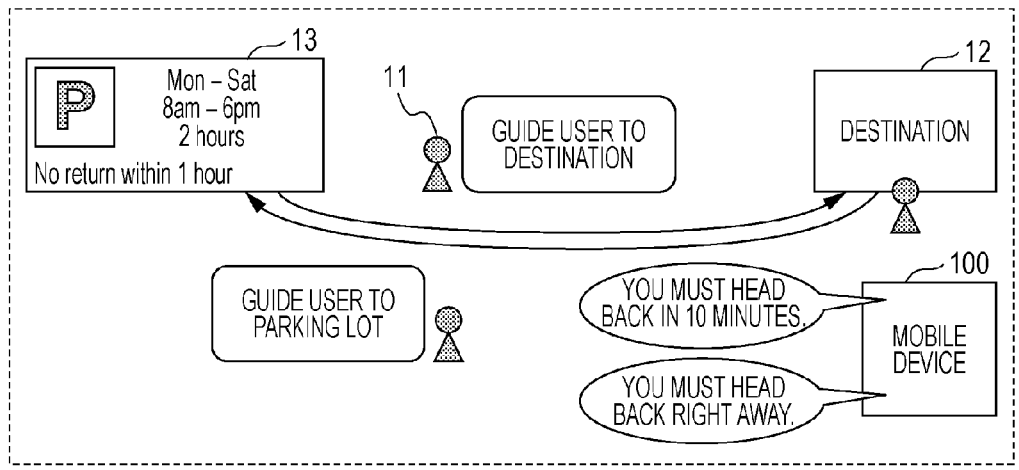
FIG. 2 is a schematic illustration of the usage of the information notification system according to the first exemplary embodiment and other exemplary embodiments.

FIG. 1 is a block diagram of the configuration of an information notification system 1 according to a first exemplary embodiment. FIG. 2 is a schematic illustration of a usage scene of the information notification system according to the first exemplary embodiment and other exemplary embodiments described below.

As illustrated in FIG. 1, according to the first exemplary embodiment, the information notification system 1 includes a mobile device 100 and a navigation system 210 mounted in a vehicle 200. The mobile device 100 includes a communication unit 101, a navigation unit 102, a dialogue processing unit 103, a measurement start determination unit 104, a remaining time measurement unit 105, a head-back notification unit 106, a clock unit 107, a display 108, a speaker 109, a microphone 110, and a vibration unit 111. The navigation system 210 mounted in the vehicle 200 includes a measurement history storage unit 211.

As illustrated in FIG. 2, a user 11 of the mobile device 100 and the vehicle 200 parks the vehicle 200 in a parking lot 13 that is close to a destination 12. The parking lot 13 is available from Monday to Saturday, and 8 AM to 6 PM. In addition, parking is limited to 2 hours with a no return period of 1 hour.

The mobile device 100 presents a route map on, for example, the display 108 to the user 11 who has just got out of the vehicle 200 and guides the user 11 to the destination 12. Upon arriving at the destination 12, the user starts shopping, for example. If the remaining time of user's stay at the destination 12 reaches a predetermined threshold value (e.g., 10 minutes according to the first exemplary embodiment), the mobile device 100 displays, for example, the message "You have 10 minutes left to stay here." on the display 108. In this manner, the mobile device 100 notifies the user 11 when the remaining time of user's stay becomes short. Note that the message is not limited to a message indicating a specific remaining time, such as the message "You have 10 minutes left to stay here.". For example, the message "You are running short of time!" may be displayed.

If the remaining time of user's stay at the destination 12 reaches zero, the mobile device 100 displays, for example, the message "You should head back right away." on the display 108. In this manner, the mobile device 100 prompts the user 11 to start heading back to the parking lot 13. After the user 11 starts heading back from the destination 12, the mobile device 100, for example, displays, on the display 108, a map showing the route to the parking lot 13 to guide the user 11 to the parking lot 13.

The mobile device 100 is a wearable terminal that the user 11 can wear (e.g., a watch-style wearable terminal, a glasses-style wearable terminal, or a smart key). Note that the mobile device 100 according to the first exemplary embodiment is not limited to a wearable terminal. For example, the mobile device 100 may be a smart phone or a cell phone. Alternatively, the mobile device 100 may be a tablet computer. Any device that the user 11 can carry can be used as the mobile device 100 according to the first exemplary embodiment.

Referring back to FIG. 1, the navigation system 210 is a widely used system that if the user 11 sets their destination, presents the user a route to the destination, searches for a parking lot near the destination, and guides the user to the parking lot. The navigation system 210 holds the attribute information regarding the found parking lot. The attribute information regarding the found parking lot includes the parking time limit indicating the duration during which a vehicle is continuously parked. Note that the measurement history storage unit 211 provided in the navigation system 210 is described in detail below.

The communication unit 101 of the mobile device 100 performs near field communication with the navigation system 210. The communication unit 101 may comply with, for example, the wireless local area network (LAN) standard. That is, the communication unit 101 may comply with a variety of wireless LAN techniques, such as a technique using a 2.4 GHz band radio wave. Any communication unit that performs near field communication with the navigation system 210 can be employed as the communication unit 101.

The clock unit 107 has a clock function for obtaining the current time. The clock unit 107 further has a function for counting an elapsed time. According to the first exemplary embodiment, the display 108 includes, for example, a liquid crystal display panel. However, the panel of the display 108 is not limited to a liquid crystal display panel. For example, a panel of another type, such as an organic electro-luminescence (EL) display panel, may be employed. The vibration unit 111 includes, for example, a motor and generates vibration by the rotation of the motor to catch the attention of the user 11.

The navigation unit 102 has a global positioning system (GPS) function, a map display function, a current location display function, a destination display function, and a calculation function of the distance between the current location and the destination. That is, the navigation unit 102 has the same functions as the navigation system 210. When the vehicle 200 is parked at the parking lot 13, the navigation system 210 sends, to the communication unit 101, setting information, such as information regarding the parking lot 13, the destination 12, and the parking time limit during which the vehicle 200 is allowed to be continuously parked at the parking lot 13. In this manner, the navigation system 210 causes the navigation unit 102 to take over the role of guiding the user 11 to the destination 12.

Figure 3:
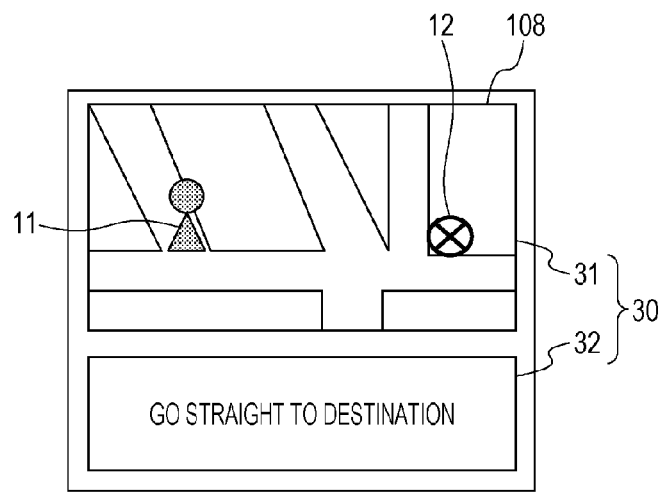
FIG. 3 illustrates a guide screen displayed on a display of a mobile device.

FIG. 3 illustrates a guide screen 30 displayed on the display 108 of the mobile device 100 as an example of a graphical user interface. The guide screen 30 includes a map display section 31 and a message display section 32. The map display section 31 displays the location of the user 11 and the destination 12 on the map of the surrounding area. The message display section 32 displays a guidance message for the user 11 (e.g., the message "Go straight to the destination").

The navigation unit 102 displays, on the display 108, the guide screen 30 illustrated in FIG. 3 on the basis of the setting information received from the navigation system 210. Thus, the navigation unit 102 guides the user 11 to the destination 12.

Referring back to FIG. 1, the microphone 110 collects the voice of a user and generates an analog audio signal. Thereafter, the microphone 110 converts the generated analog audio signal into digital data and generates a digital audio signal. The microphone 110 outputs the generated digital audio signal to the dialogue processing unit 103.

The dialogue processing unit 103 has a speech recognition function and a speech synthesis function. The dialogue processing unit 103 includes an acoustic model and a language model for speech recognition. The dialogue processing unit 103 further includes a scenario that determines a reply to the generated speech. The dialogue processing unit 103 recognizes a speech generated on the basis of the audio signal input from the microphone 110, synthesizes a reply speech in accordance with the scenario, and outputs the synthesized speech from the speaker 109.

The measurement start determination unit 104 determines whether the measurement of an elapsed time is to be started. For example, the measurement start determination unit 104 may determine that the measurement of an elapsed time is to be started at the following timing: a time when the user 11 stops the engine of the vehicle 200 at the parking lot 13, a time when the user 11 gets out of the vehicle 200 and locks the door at the parking lot 13, a time when the user 11 performs a predetermined operation on the mobile device 100, or a time when the user 11 instructs the mobile device 100 to start the measurement using speech.

Alternatively, the measurement start determination unit 104 may determine that the measurement of an elapsed time is to be started at the following timing: a time when the navigation unit 102 detects arrival of the vehicle 200 at the parking lot 13 using the GPS function of the navigation unit 102 or a time when the measurement start determination unit 104 detects that the vehicle 200 passes through the gate of the parking lot 13 or the user picks up a parking ticket of the parking lot 13 through communication between the communication unit 101 and the gate of the parking lot 13.

If the measurement start determination unit 104 determines that the measurement of an elapsed time is to be started, the remaining time measurement unit 105 starts measuring the elapsed time using the clock unit 107. The remaining time measurement unit 105 measures a travel time Tm required for the user 11 to move from the parking lot 13 to the destination 12 (an example of a measurement unit). The remaining time measurement unit 105 obtains a value that is twice the travel time Tm as a round trip time required for the user 11 to make a round trip between the parking lot 13 and the destination 12 (an example of a second obtaining unit). The remaining time measurement unit 105 (an example of a first obtaining unit) obtains, from the navigation unit 102, the parking time limit during which the vehicle 200 can be continuously parked at the parking lot 13.

The remaining time measurement unit 105 (an example of a time calculating unit) calculates a remaining time Tr for which the user 11 is allowed to stay at the destination 12 as follows:

$$Tr = Tp - Tm \times 2 - Ts \quad (1)$$

where Tp is the parking time limit (according to the first exemplary embodiment, Tp=120 minutes, as illustrated in FIG. 2), and Ts is an elapsed time from a point in time at which the user 11 arrived at the destination 12.

According to the first exemplary embodiment, as described above, the value which is twice the travel time Tm is used as a round trip time required for the user 11 to make a round trip between the parking lot 13 and the destination 12. That is, the time required for the user 11 to move from the destination 12 to the parking lot 13 is considered to be the same as the travel time Tm that is actually required for the user 11 to move from the parking lot 13 to the destination 12.

The remaining time measurement unit 105 (an example of a determination unit) determines whether the remaining time Tr reaches a predetermined threshold value Tth (according to the first exemplary embodiment, for example, Tth=10 minutes). In addition, the remaining time measurement unit 105 determines whether the remaining time Tr reaches zero.

If the remaining time measurement unit 105 determines that the remaining time Tr reaches the threshold value Tth, the head-back notification unit 106 (an example of a notification unit) prenotifies the user 11 that the remaining time Tr reaches the threshold value Tth. In this manner, the head-back notification unit 106 prompts the user 11 to prepare for leaving the destination 12 using such a prior notification.

If the remaining time measurement unit 105 determines that the remaining time Tr reaches zero, the head-back notification unit 106 notifies the user 11 that the remaining time Tr reaches zero. The head-back notification unit 106 prompts the user 11 to leave the destination 12 for the parking lot 13 using the notification.

FIGS. 4 and 5 illustrate a notification screen 40 displayed on the display 108 of the mobile device 100 as an example of a graphical user interface. The notification screen 40 includes a map display section 41 and a message display section 42. The map display section 41 displays the location of the user 11 and the destination 12 on the map of the surrounding area. The screens indicate that the user 11 currently stays at the destination 12.

In addition, as illustrated in FIG. 4, the message display section 42 displays the prior notification message "You have 10 minutes left to stay here." for the user 11. Note that the message is not limited to a message indicating a specific remaining time, such as the message "You have 10 minutes left to stay here". For example, the message "You are running short of time!" may be displayed in the message display section 42.

In addition, as illustrated in FIG. 5, the message display section 42 displays the message "It's time to head back" so as to prompt the user 11 to leave the destination 12 for the parking lot 13.

Note that in FIG. 5, the device used to notify the user 11 that the remaining time reaches zero is not limited to the display 108. In FIG. 5, a notification 51 using the sound "PIP PIP PIP!", a notification 52 using music, and a notification 53 using the speech "You should head back right away." are made using the speaker 109. In addition, a notification 54 using vibration is made using the vibrating alert "BZZZZZ!" generated by the vibration unit 111.

While the notifications 51 to 54 are illustrated in only FIG. 5, the notifications 51 to 54 may be made as the prior notification illustrated in FIG. 4 using the speaker 109 or the vibration unit 111. At least one of the notifications using the display 108, the speaker 109, and the vibration unit 111 illustrated in FIGS. 4 and 5 can be employed as a notification for the user 11. In addition to the notifications illustrated in FIGS. 4 and 5, the text displayed on the display 108 may be blinked, for example.

When, in FIG. 5, the notification 53 (i.e., the speech "You should head back right away") is employed to notify the user 11 that the remaining time reaches zero and if the remaining time Tr calculated by the remaining time measurement unit 105 becomes zero, the head-back notification unit 106 instructs the dialogue processing unit 103 to notify that the remaining time Tr reaches zero. Upon receiving the instruction, the dialogue processing unit 103 outputs the speech "You should head back right away" from the speaker 109.

Figure 6:
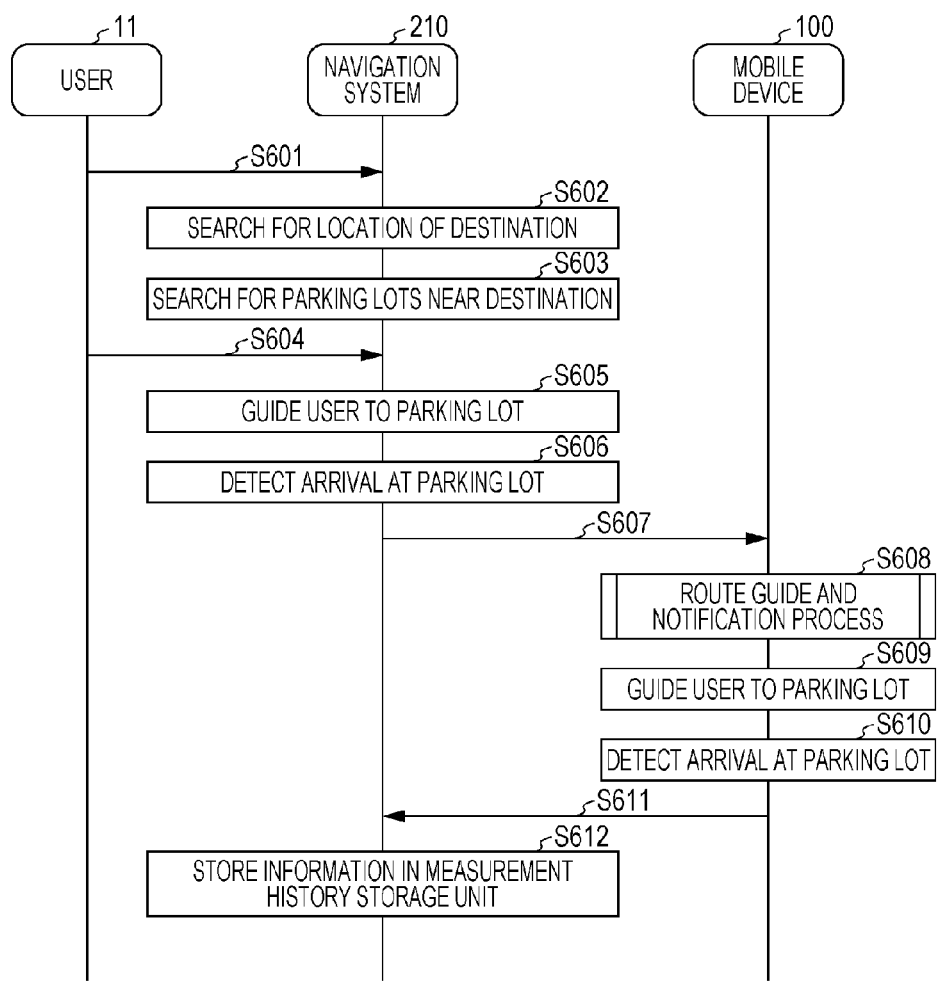
FIG. 6 is a sequence diagram schematically illustrating the operation performed by the information notification system illustrated in FIG. 1 according to the first exemplary embodiment.

FIG. 6 is a sequence diagram schematically illustrating the operation performed by the information notification system 1 illustrated in FIG. 1 according to the first exemplary embodiment. The operation illustrated in FIG. 6 starts when the user 11 drives the vehicle 200 and leaves home.

The user 11 operates the navigation system 210 to set the destination 12 first (step S601). After the destination 12 is set, the navigation system 210 searches for the location of the destination 12 (step S602). Subsequently, the navigation system 210 searches for parking lots located near the destination 12 and presents the found parking lots to the user 11 (step S603).

The user 11 selects the parking lot 13 from among the presented parking lots (step S604). The navigation system 210 guides the user 11 to the parking lot 13 that is selected (step S605). The navigation system 210 detects that the vehicle 200 has arrived at the parking lot 13 using, for example, the GPS function (step S606).

Subsequently, the navigation system 210 sends, to the communication unit 101 of the mobile device 100, the information regarding the destination 12, such as the location of the destination 12, and the attribute information regarding the parking lot 13, such as the parking time limit (step S607, an example of a first obtaining step).

The mobile device 100 performs a route guide and notification process for the user 11 using the information sent from the navigation system 210 (step S608). The route guide and notification process is described in more detail below with reference to FIG. 7.

After the route guide and notification process performed in step S608 are completed, the navigation unit 102 of the mobile device 100 guides the user 11 to the parking lot 13 (step S609). The navigation unit 102 detects that the user 11 has arrived at the parking lot 13 using the GPS function (step S610). Note that the mobile device 100 measures the time required for the user 11 to move from the destination 12 to the parking lot 13.

When the user 11 arrives at the parking lot 13, the communication unit 101 of the mobile device 100 sends, to the navigation system 210, the length of time measured for the movement of the user 11 from the destination 12 to the parking lot 13 (step S611).

The navigation system 210 stores the measured length of time sent from the mobile device 100 in the measurement history storage unit 211 (step S612). Thereafter, the processing illustrated in FIG. 6 is completed. By storing the measured length of time sent from the mobile device 100 in the measurement history storage unit 211 in this manner, the measured length of time stored in the measurement history storage unit 211 can be used when the user 11 parks the vehicle 200 in the parking lot 13 and moves to the destination 12 next time.

Note that in step S611, the communication unit 101 of the mobile device 100 may further send, to the navigation system 210, the travel time required for the user 11 to move from the parking lot 13 to the destination 12 and the staying time for which the user 11 stayed at the destination 12. In step S612, the navigation system 210 may store the received lengths of time in the measurement history storage unit 211.

Figure 7:
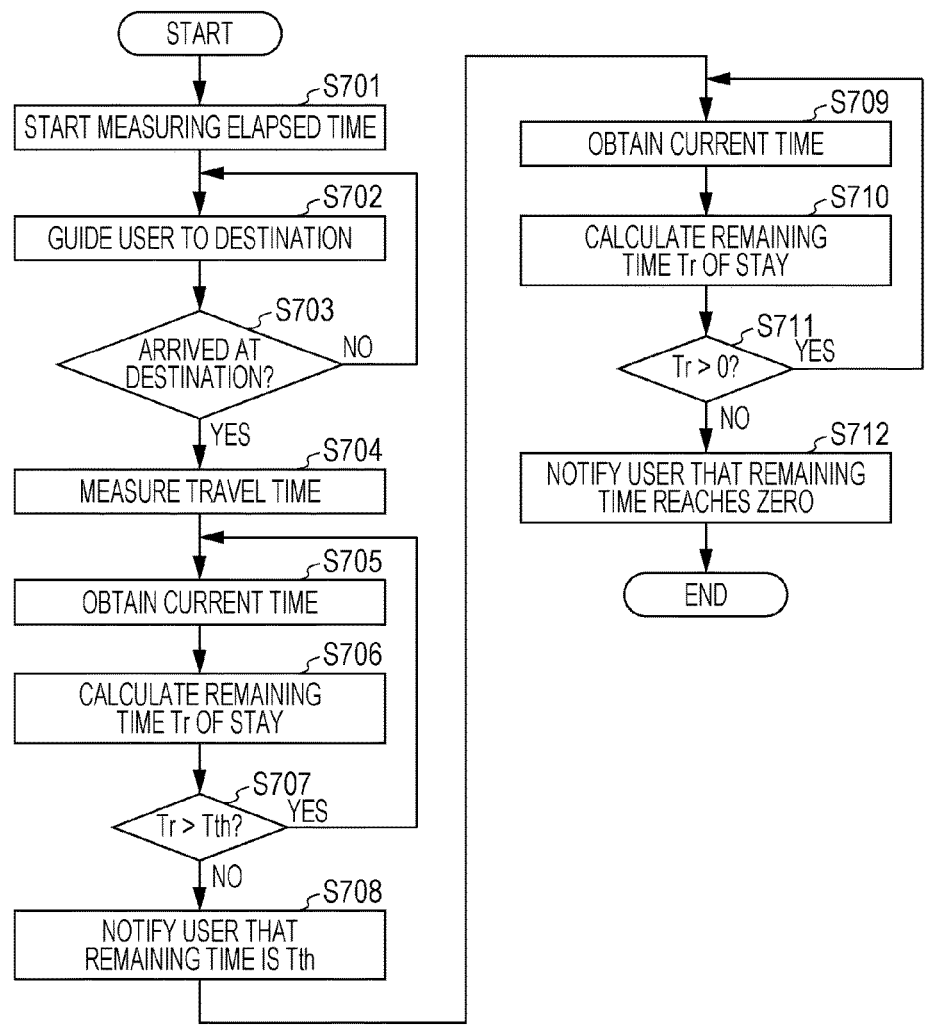
FIG. 7 is a flowchart schematically illustrating the procedure for a route guide and notification process performed by a mobile device.

FIG. 7 is a flowchart schematically illustrating the procedure for the route guide and notification process performed by the mobile device 100 (step S608 in FIG. 6). The processing illustrated in FIG. 7 starts if it is determined that the measurement start determination unit 104 starts measuring the elapsed time.

The remaining time measurement unit 105 starts measuring the elapsed time using the clock unit 107 first (step S701). Subsequently, as illustrated in FIG. 3, the navigation unit 102 guides the user 11 to the destination 12 (step S702). The navigation unit 102 determines whether the user 11 has arrived at the destination 12 (step S703). If the user 11 has not yet arrived at the destination 12 (NO in step S703), the processes in steps S702 and S703 are repeated until the user 11 arrives at the destination 12.

If the user 11 has arrived at the destination 12 (YES in step S703), the remaining time measurement unit 105 calculates the travel time Tm required for the user 11 to move from the parking lot 13 to the destination 12 (step S704, an example of a measuring step). Subsequently, the remaining time measurement unit 105 obtains the current time from the clock unit 107 (step S705).

Subsequently, in step S706, the remaining time measurement unit 105 obtains a value which is twice the measured travel time Tm as a round trip time required for the user 11 to make a round trip between the parking lot 13 and the destination 12 (an example of a second obtaining step). The remaining time measurement unit 105 calculates the remaining time Tr during which the user 11 can stay at the destination 12 using the above-described equation (1) (an example of a time calculation step).

Subsequently, the remaining time measurement unit 105 determines whether the remaining time Tr is greater than the threshold value Tth (according to the first exemplary embodiment, for example, Tth=10 minutes) (step S707, an example of a determination step). If the remaining time Tr is greater than the threshold value Tth (YES in step S707), the processing returns to step S705, where the processes in steps S705 to S707 are repeated.

If the remaining time Tr becomes less than or equal to the threshold value Tth (NO in step S707), the head-back notification unit 106 notifies the user 11 that the remaining time Tr during which the user 11 can stay at the destination 12 reaches the threshold value Tth, as illustrated in FIG. 4 (step S708, an example of a notification step).

Subsequently, the remaining time measurement unit 105 obtains the current time from the clock unit 107 (step S709). Thereafter, the remaining time measurement unit 105 calculates the remaining time Tr during which the user 11 can stay at the destination 12 using the above-described equation (1) (step S710).

Subsequently, the remaining time measurement unit 105 determines whether the remaining time Tr is greater than zero (step S711). If the remaining time Tr is greater than zero (YES in step S711), the processing returns to step S709, where the processes in steps S709 to S711 are repeated.

However, if the remaining time Tr is less than zero (NO in step S711), the head-back notification unit 106 notifies the user 11 that the remaining time Tr during which the user 11 can stay at the destination 12 becomes zero, as illustrated in FIG. 5. Thus, the head-back notification unit 106 prompts the user 11 to leave the destination 12 (step S712). Thereafter, the processing illustrated in FIG. 7 is completed.

Figure 8:
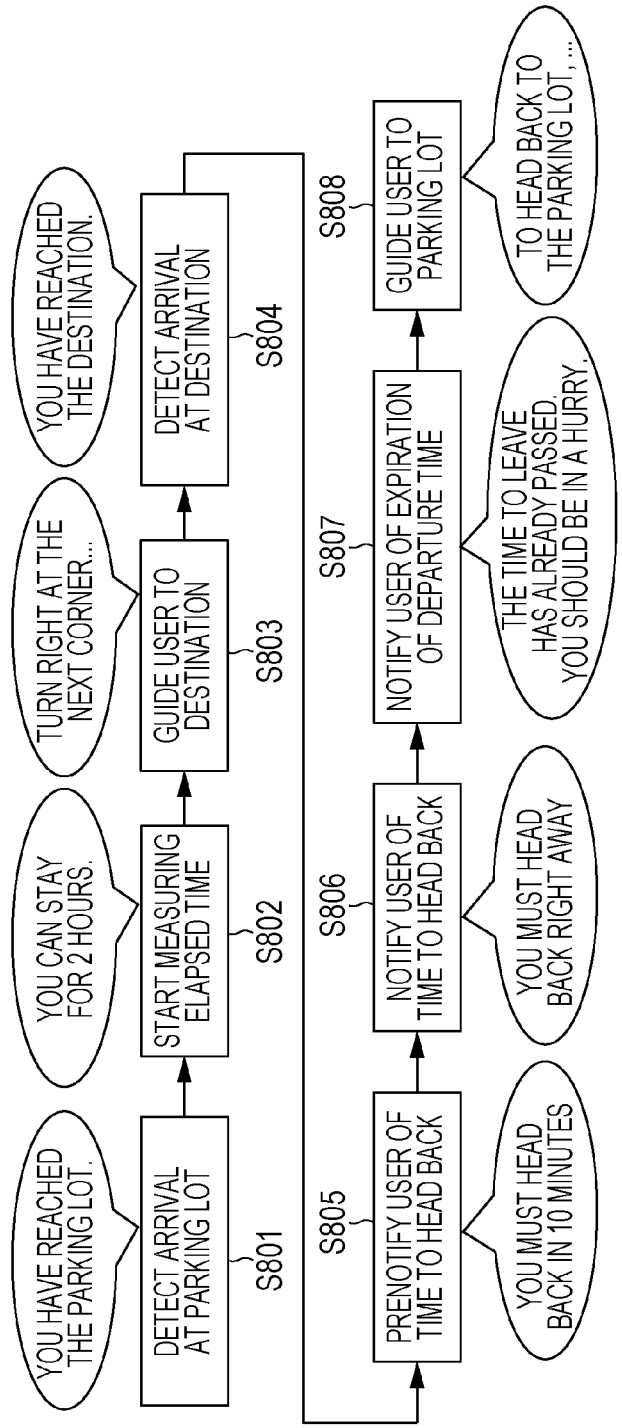
FIG. 8 is a flowchart schematically illustrating a speech output operation performed by the information notification system according to the first exemplary embodiment.

FIG. 8 is a flowchart schematically illustrating a speech output operation performed by the information notification system 1 according to the first exemplary embodiment. This speech output operation is an example of a speech interface. The operation illustrated in FIG. 8 starts when the vehicle 200 driven by the user 11 arrives at the parking lot 13.

In step S801, upon detecting that the vehicle 200 has arrived at the parking lot 13, the navigation system 210 sends the information indicating the arrival to the communication unit 101 of the mobile device 100. Thus, the dialogue processing unit 103 of the mobile device 100 outputs, to the user 11, the voice guidance "You have reached the parking lot" from the speaker 109.

In step S802, the remaining time measurement unit 105 starts measuring the elapsed time using the clock unit 107. The dialogue processing unit 103 outputs, to the user 11, the voice guidance "You can stay for 2 hours" from the speaker 109.

In step S803, the navigation unit 102 guides the user 11 to the destination 12. To guide the user 11 to the destination 12, the dialogue processing unit 103 outputs the voice navigation "Turn right at the next corner" from the speaker 109, for example.

In step S804, the navigation unit 102 detects that the user 11 has arrived at the destination 12. The dialogue processing unit 103 outputs, to the user 11, the voice guidance "You have reached the destination" from the speaker 109.

In step S805, if the remaining time measurement unit 105 detects that the remaining time Tr during which the user 11 can stay reaches the threshold value Tth (according to the first exemplary embodiment, for example, Tth=10 minutes), the head-back notification unit 106 instructs the dialogue processing unit 103 to prenotify the user 11 of the time to head back to the parking lot 13. The dialogue processing unit 103 outputs, to the user 11, the voice guidance "You must head back in 10 minutes" from the speaker 109 on the basis of the instruction received from the head-back notification unit 106.

In step S806, if the remaining time measurement unit 105 detects that the remaining time Tr during which the user 11 can stay reaches zero, the head-back notification unit 106 instructs the dialogue processing unit 103 to notify the user 11 that the time at which the user 11 must head back is reached. The dialogue processing unit 103 outputs, to the user 11, the voice guidance "You must head back right away" from the speaker 109 on the basis of the instruction received from the head-back notification unit 106.

In step S807, if the remaining time measurement unit 105 detects that the remaining time Tr has expired, the head-back notification unit 106 instructs the dialogue processing unit 103 to notify the user 11 that the time at which the user 11 must leave has already passed. The dialogue processing unit 103 outputs, to the user 11, the voice guidance "The time to leave has already passed. You should be in a hurry." from the speaker 109 on the basis of the instruction received from the head-back notification unit 106.

In step S808, the navigation unit 102 guides the user 11 to the parking lot 13. To guide the user 11 to the parking lot 13, the dialogue processing unit 103 outputs the voice guidance "To head back to the parking lot, . . . " from the speaker 109, for example.

As described above, according to the first exemplary embodiment, if the remaining time measurement unit 105 detects that the remaining time Tr during which the user 11 can stay reaches the threshold value Tth, the head-back notification unit 106 prenotifies the user 11 that the time to leave is reached. In this manner, according to the first exemplary embodiment, the user 11 can be reminded of their departure.

Second Exemplary Embodiment

Figure 9:
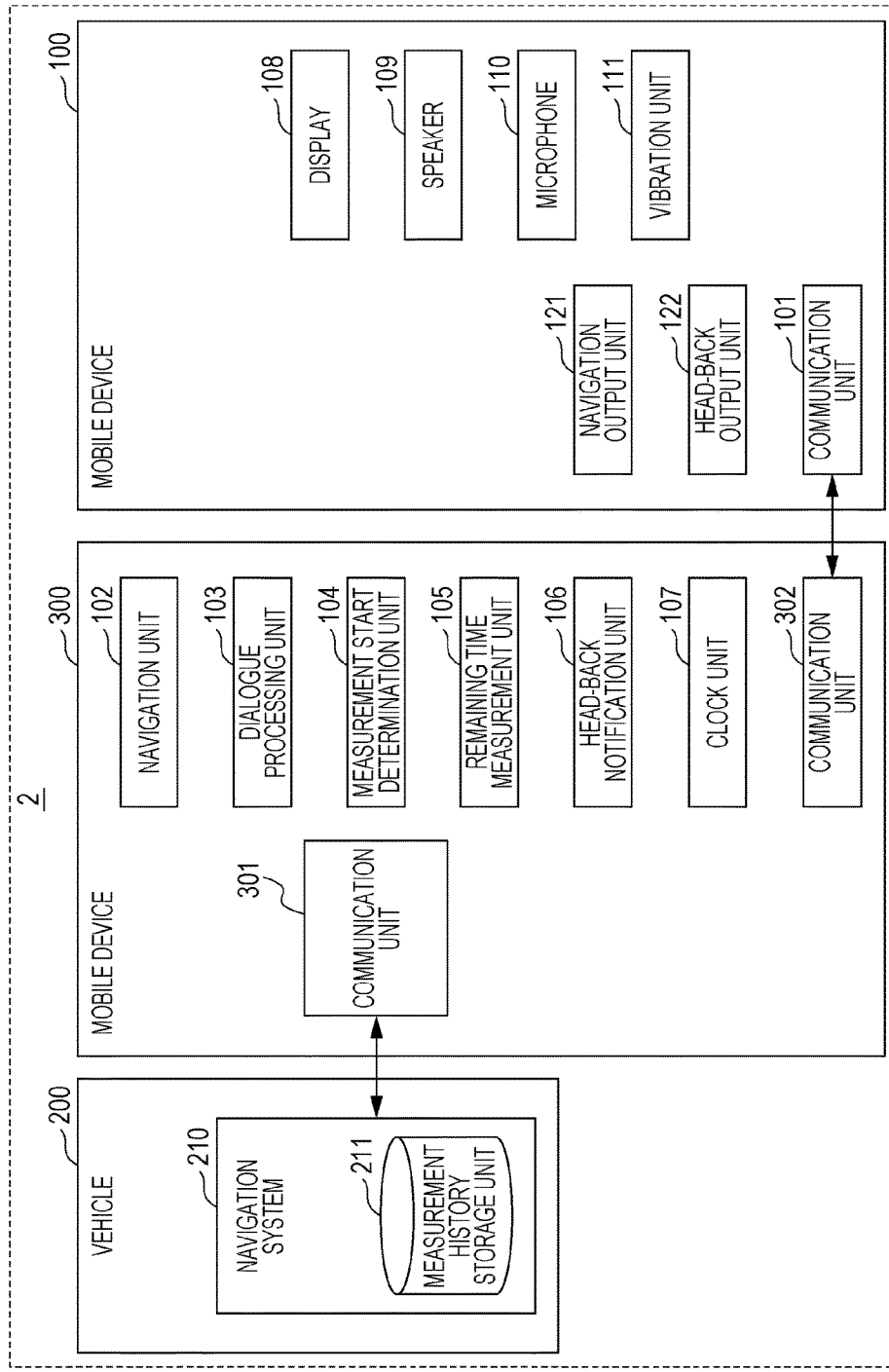
FIG. 9 is a block diagram of the configuration of an information notification system according to a second exemplary embodiment.

FIG. 9 is a block diagram of the configuration of an information notification system 2 according to a second exemplary embodiment. As illustrated in FIG. 9, the information notification system 2 according to the second exemplary embodiment includes a mobile device 300 in addition to the mobile device 100 and the navigation system 210 mounted in the vehicle 200. The second exemplary embodiment is described below with reference to the difference between the information notification system 1 of the first exemplary embodiment and the information notification system 2.

According to the second exemplary embodiment, the mobile device 100 includes a communication unit 101, a display 108, a speaker 109, a microphone 110, a vibration unit 111, a navigation output unit 121, and a head-back output unit 122. The mobile device 300 includes a navigation unit 102, a dialogue processing unit 103, a measurement start determination unit 104, a remaining time measurement unit 105, the head-back notification unit 106, the clock unit 107, and communication units 301 and 302.

As described above, the mobile device 300 includes the navigation unit 102, the dialogue processing unit 103, the measurement start determination unit 104, the remaining time measurement unit 105, the head-back notification unit 106, and the clock unit 107, which the mobile device 100 according to the first exemplary embodiment includes. Unlike the first exemplary embodiment, the mobile device 100 according to the second exemplary embodiment does not include these functions.

According to the second exemplary embodiment, the mobile device 100 is a wearable terminal that the user 11 can wear (e.g., a watch-style wearable terminal, a glasses-style wearable terminal, or a smart key). The mobile device 300 is, for example, a device that the user 11 can carry, such as a smart phone, a cell phone, or a tablet computer.

Like the communication unit 101 of the mobile device 100 according to the first exemplary embodiment, each of the communication units 301 and 302 of the mobile device 300 has a near field communication function. The communication unit 301 communicates with the navigation system 210. The communication unit 302 communicates with the communication unit 101 of the mobile device 100.

The navigation output unit 121 guides the user 11 who wears the mobile device 100 from the parking lot 13 to the destination 12 and from the destination 12 to the parking lot 13 using, for example, the information displayed on the display 108 or a voice output from the speaker 109 on the basis of the information output from the navigation unit 102 of the mobile device 300.

The head-back output unit 122 provides, to the user 11 who wears the mobile device 100, both the prior notification and the notification of the time at which the user 11 should leave using the information displayed on the display 108 or a voice output from the speaker 109 on the basis of the information output from the head-back notification unit 106 of the mobile device 300.

As described above, according to the second exemplary embodiment, the guiding process for the user 11, the speech processing, the measurement process, and the notification process that are heavy load processes are performed by the mobile device 300. In contrast, the mobile device 100 only outputs the result of the process performed by the mobile device 300.

Figure 10:
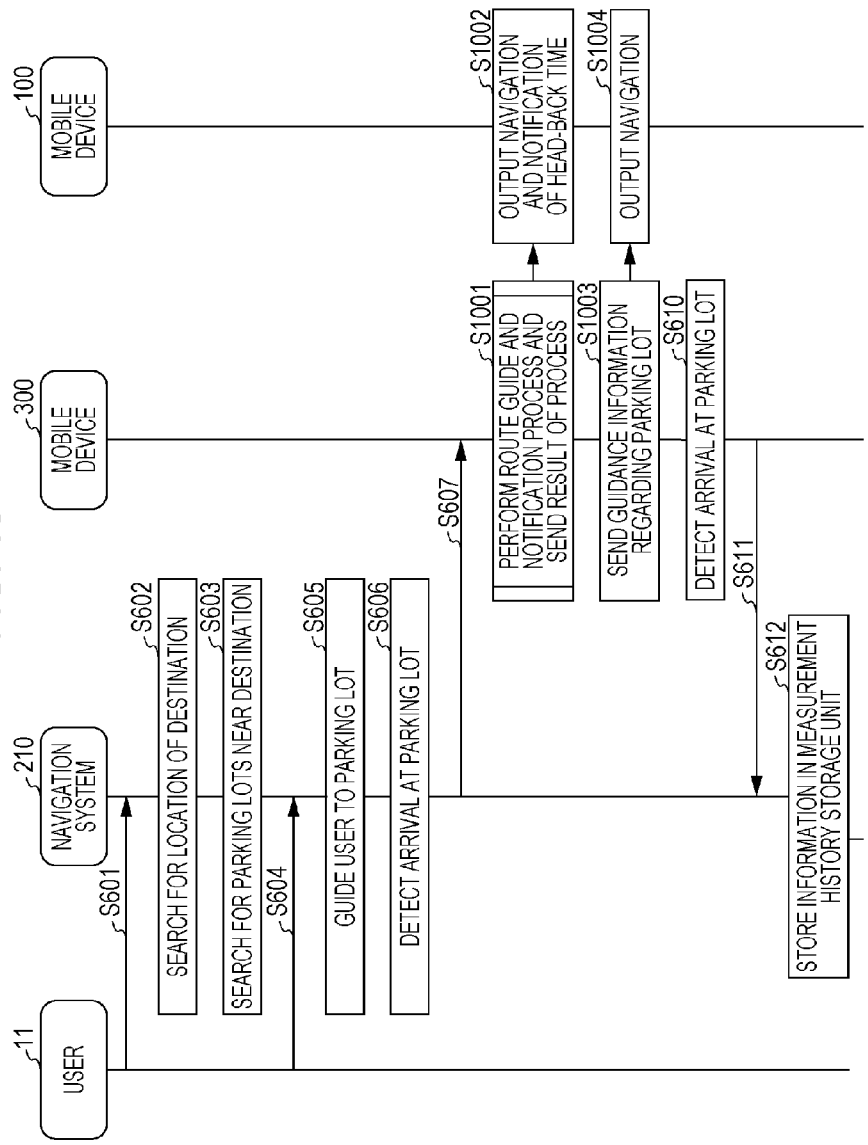
FIG. 10 is a sequence diagram schematically illustrating the operation performed by the information notification system illustrated in FIG. 9 according to the second exemplary embodiment.

FIG. 10 is a sequence diagram schematically illustrating the operation performed by the information notification system 2 illustrated in FIG. 9 according to the second exemplary embodiment. Like the operation illustrated in FIG. 6 according to the first exemplary embodiment, the operation illustrated in FIG. 10 starts when the user 11 drives the vehicle 200 and leaves home. Note the same numbering will be used in referring to FIG. 10 as is utilized above in describing the first exemplary embodiment and, thus, detailed description of the process is not repeated.

In steps S601 to S607, the processes that are the same as in the first exemplary embodiment (steps S601 to S607 in FIG. 6) are performed. Note that unlike the first exemplary embodiment (step S607 in FIG. 6), in step S607, the information regarding the destination 12 and the attribute information regarding the parking lot 13 are sent to the communication unit 301 of the mobile device 300.

In step S1001 subsequent to step S607, the mobile device 300 performs the route guide and notification process for the user 11 using the information sent from the navigation system 210 and sends the result of the processes to the communication unit 101 of the mobile device 100. The route guide and notification process is the same as that in the first exemplary embodiment illustrated in FIG. 7.

In step S1002, the navigation output unit 121 of the mobile device 100 guides the user 11 to the destination 12, and the head-back output unit 122 notifies the user 11 of the remaining time using the result of processes sent from the mobile device 300.

In step S1003, the navigation unit 102 of the mobile device 300 sends, to the mobile device 100, the guidance information regarding the parking lot 13 for the user 11. In step S1004, the navigation output unit 121 of the mobile device 100 guides the user 11 to the parking lot 13 using the guidance information sent from the mobile device 300. In steps S610 to S612 subsequent to step S1004, the processes that are the same as those in the first exemplary embodiment (steps S610 to S612 in FIG. 6) are performed.

As described above, according to the second exemplary embodiment, the information notification system 2 performs an operation that is similar to that of the information notification system 1 according to the first exemplary embodiment. As a result, like the first exemplary embodiment, according to the second exemplary embodiment, the user 11 can be reminded of their departure.

In the information notification system 2 according to the second exemplary embodiment, since the heavy load processes are performed by the mobile device 300, the processing load imposed on the mobile device 100 can be reduced from that in the first exemplary embodiment. Thus, according to the second exemplary embodiment, the mobile device 100 can reduce power consumption from that in the first exemplary embodiment. As a result, according to the second exemplary embodiment, the run time of a battery, which is a power source of the mobile device 100, can last longer than in the first exemplary embodiment.

Third Exemplary Embodiment

Figure 11:
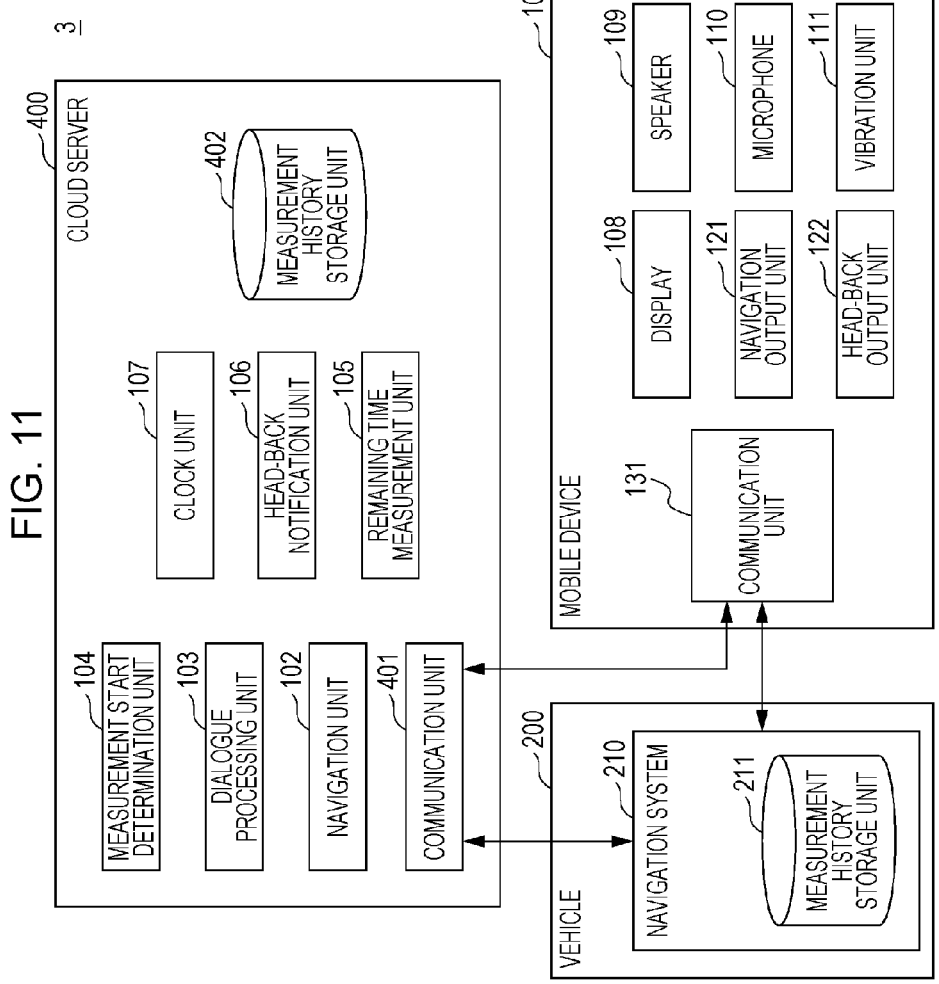
FIG. 11 is a block diagram of the configuration of an information notification system according to a third exemplary embodiment.

FIG. 11 is a block diagram of the configuration of an information notification system 3 according to a third exemplary embodiment. As illustrated in FIG. 11, the information notification system 3 according to the third exemplary embodiment includes a cloud server 400 in addition to the mobile device 100 and the navigation system 210 mounted in the vehicle 200. The third exemplary embodiment is described below with reference to the differences from the first and second exemplary embodiments.

According to the third exemplary embodiment, the mobile device 100 includes a communication unit 131, the display 108, the speaker 109, the microphone 110, the vibration unit 111, the navigation output unit 121, and the head-back output unit 122.

The cloud server 400 includes the navigation unit 102, the dialogue processing unit 103, the measurement start determination unit 104, the remaining time measurement unit 105, the head-back notification unit 106, the clock unit 107, a communication unit 401, and a measurement history storage unit 402.

As described above, the cloud server 400 includes the navigation unit 102, the dialogue processing unit 103, the measurement start determination unit 104, the remaining time measurement unit 105, the head-back notification unit 106, and the clock unit 107, which the mobile device 100 according to the first exemplary embodiment includes. Unlike the first exemplary embodiment, the mobile device 100 according to the third exemplary embodiment does not include these functions.

According to the third exemplary embodiment, the mobile device 100 is a wearable terminal that the user 11 can wear (e.g., a watch-style wearable terminal, a glasses-style wearable terminal, or a smart key). Note that the mobile device 100 according to the third exemplary embodiment is not limited to a wearable terminal. For example, the mobile device 100 may be a smart phone or a cell phone. Alternatively, the mobile device 100 may be a tablet computer. The mobile device 100 according to the third exemplary embodiment may be any device that the user 11 can carry.

The communication unit 131 of the mobile device 100 communicates with the communication unit 401 of the cloud server 400 via a mobile telephone network or the Internet. In addition, the communication unit 131 can perform near field communication with the navigation system 210. The navigation system 210 can communicate with the communication unit 401 of the cloud server 400 via a mobile telephone network or the Internet.

According to the third exemplary embodiment, the guiding process for the user 11, the speech processing, the measurement process, and the notification process that are heavy load processes are performed by the cloud server 400. In contrast, like the mobile device 100 according to the second exemplary embodiment, the mobile device 100 according to the third exemplary embodiment only outputs the result of the process performed by the cloud server 400.

Figure 12:
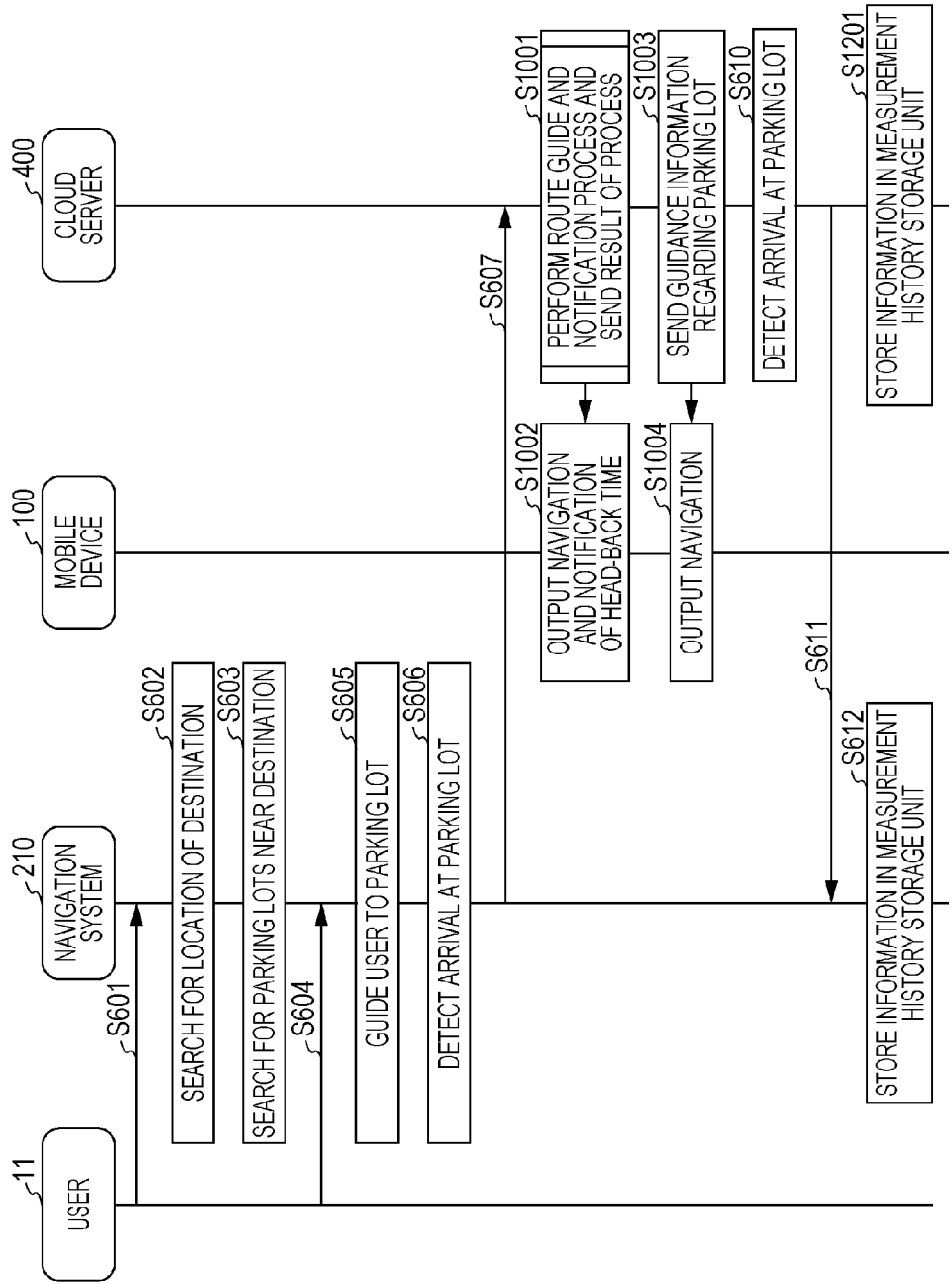
FIG. 12 is a sequence diagram schematically illustrating the operation performed by the information notification system illustrated in FIG. 11 according to the third exemplary embodiment.

FIG. 12 is a sequence diagram schematically illustrating the operation performed by the information notification system 3 illustrated in FIG. 11 according to the third exemplary embodiment. Like the operation illustrated in FIG. 6 according to the first exemplary embodiment, the operation illustrated in FIG. 12 starts when the user 11 drives the vehicle 200 and leaves home. Note the same numbering will be used in referring to FIG. 12 as is utilized above in describing the first and second exemplary embodiments and, thus, detailed description of the process is not repeated.

In steps S601 to S607, the processes that are the same as in the first exemplary embodiment (steps S601 to S607 in FIG. 6) are performed. Note that unlike the first exemplary embodiment (step S607 in FIG. 6), in step S607, the information regarding the destination 12 and the attribute information regarding the parking lot 13 are sent to the communication unit 401 of the cloud server 400.

In steps S1001 to S1004 subsequent to step S607, although the processes in step S1001 and S1003 are performed by the cloud server 400, the same processing as that of the second exemplary embodiment (steps S1001 to S1004 in FIG. 10) is performed.

In steps S610 to S612 subsequent to step S1004, although the processes in step S610 and S611 are performed by the cloud server 400, the same processing as that of the first exemplary embodiment (steps S610 to S612 in FIG. 6) is performed.

In step S1201, the cloud server 400 stores, in the measurement history storage unit 402, the travel time required for the user 11 to move from the destination 12 to the parking lot 13.

Note that in step S1201, the cloud server 400 may further store, in the measurement history storage unit 402, the travel time required for the user 11 to move from the parking lot 13 to the destination 12 and the staying time during which the user 11 stays at the destination 12.

As described above, according to the third exemplary embodiment, the information notification system 3 performs an operation that is similar to that of the information notification system 1 according to the first exemplary embodiment. As a result, like the first exemplary embodiment, according to the third exemplary embodiment, the user 11 can be reminded of their departure.

In the information notification system 3 according to the third exemplary embodiment, since the heavy load processes are performed by the cloud server 400, the processing load imposed on the mobile device 100 can be reduced. Thus, according to the third exemplary embodiment, the mobile device 100 can reduce power consumption from that in the first exemplary embodiment. As a result, according to the third exemplary embodiment, the run time of a battery, which is a power source of the mobile device 100, can be increased more than in the first exemplary embodiment.

Fourth Exemplary Embodiment

Figure 13:
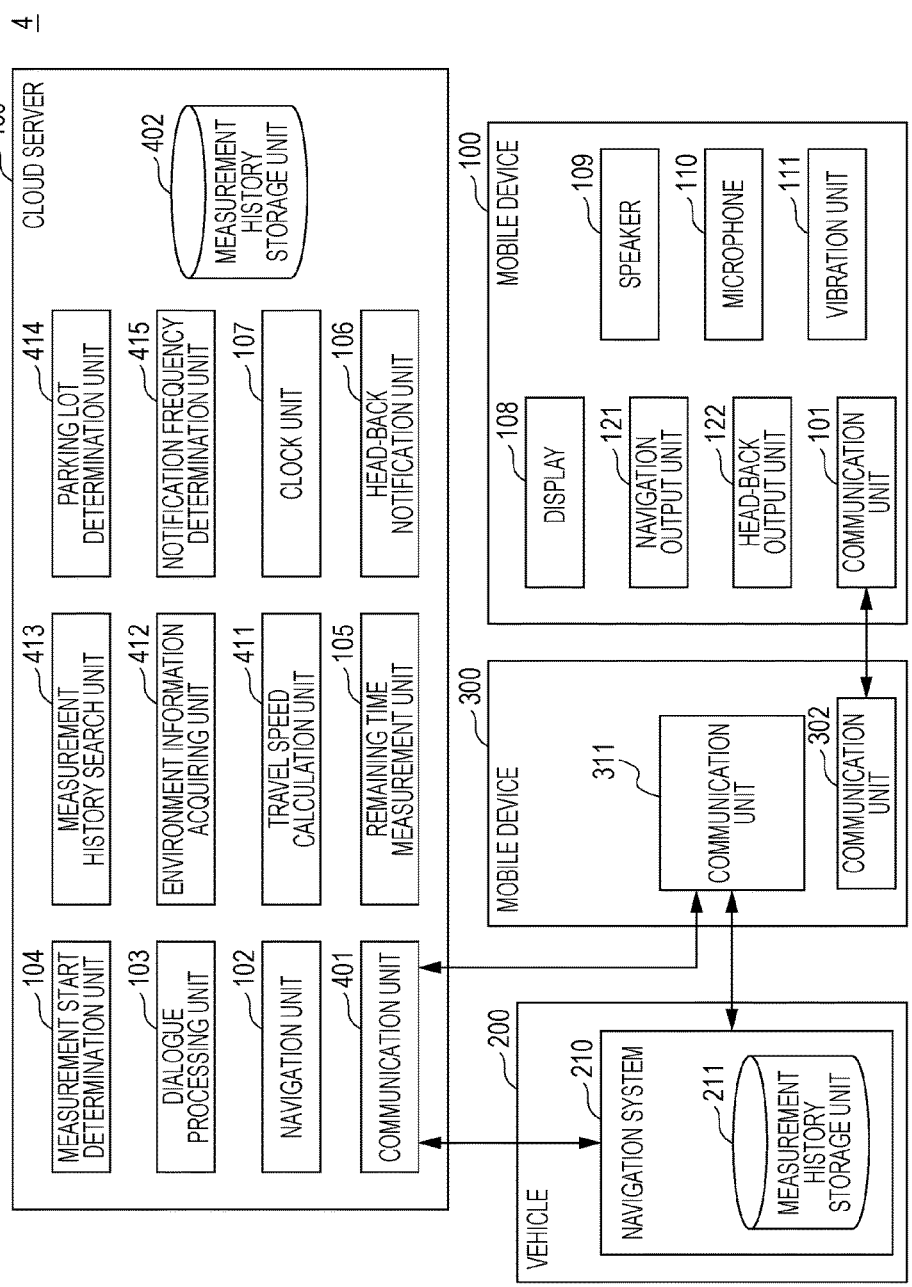
FIG. 13 is a block diagram of the configuration of an information notification system according to a fourth exemplary embodiment.

FIG. 13 is a block diagram of the configuration of an information notification system 4 according to a fourth exemplary embodiment. As illustrated in FIG. 13, the information notification system 4 according to the fourth exemplary embodiment includes a mobile device 300 and a cloud server 400 in addition to the mobile device 100 and the navigation system 210 mounted in the vehicle 200. The fourth exemplary embodiment is described below with reference to the differences from the first to third exemplary embodiments.

According to the fourth exemplary embodiment, the mobile device 100 includes the communication unit 101, the display 108, the speaker 109, the microphone 110, the vibration unit 111, the navigation output unit 121, and the head-back output unit 122. The mobile device 300 according to the fourth exemplary embodiment includes communication units 302 and 311.

According to the fourth exemplary embodiment, the cloud server 400 includes the navigation unit 102, the dialogue processing unit 103, the measurement start determination unit 104, the remaining time measurement unit 105, the head-back notification unit 106, the clock unit 107, a communication unit 401, a measurement history storage unit 402, a travel speed calculation unit 411, an environment information acquiring unit 412, a measurement history search unit 413, a parking lot determination unit 414, a notification frequency determination unit 415. Note that the travel speed calculation unit 411, the environment information acquiring unit 412, the measurement history search unit 413, the parking lot determination unit 414, and the notification frequency determination unit 415 are described below.

As described above, the cloud server 400 includes the navigation unit 102, the dialogue processing unit 103, the measurement start determination unit 104, the remaining time measurement unit 105, the head-back notification unit 106, and the clock unit 107, which the mobile device 100 according to the first exemplary embodiment includes. Unlike the first exemplary embodiment, the mobile device 100 according to the fourth exemplary embodiment does not include these functions.

Like the communication unit 302 of the second exemplary embodiment (refer to FIG. 9), the communication unit 302 of the mobile device 300 can perform near field communication with the communication unit 101 of the mobile device 100. The communication unit 311 can communicate with the communication unit 401 of the cloud server 400 via a mobile telephone network or the Internet. In addition, the communication unit 311 can perform near field communication with the navigation system 210. The navigation system 210 can communicate with the communication unit 401 of the cloud server 400 via the mobile telephone network or the Internet.

According to the fourth exemplary embodiment, the mobile device 100 is a wearable terminal that the user 11 can wear (e.g., a watch-style wearable terminal, a glasses-style wearable terminal, or a smart key). Note that the mobile device 300 according to the fourth exemplary embodiment is a device that the user 11 can carry, such as a smart phone or a tablet computer.

Like the third exemplary embodiment, according to the fourth exemplary embodiment, the guiding process for the user 11, the speech processing, the measurement process, and the notification process that are heavy load processes are performed by the cloud server 400. In contrast, like the mobile device 100 according to the second exemplary embodiment, the mobile device 100 according to the fourth exemplary embodiment only outputs the result of the process performed by the cloud server 400.

According to the fourth exemplary embodiment, the mobile device 300 relays communication between the cloud server 400 and the mobile device 100. As a result, the mobile device 100 according to the fourth exemplary embodiment can include only the communication unit 101 that performs near field communication.

Figure 14:
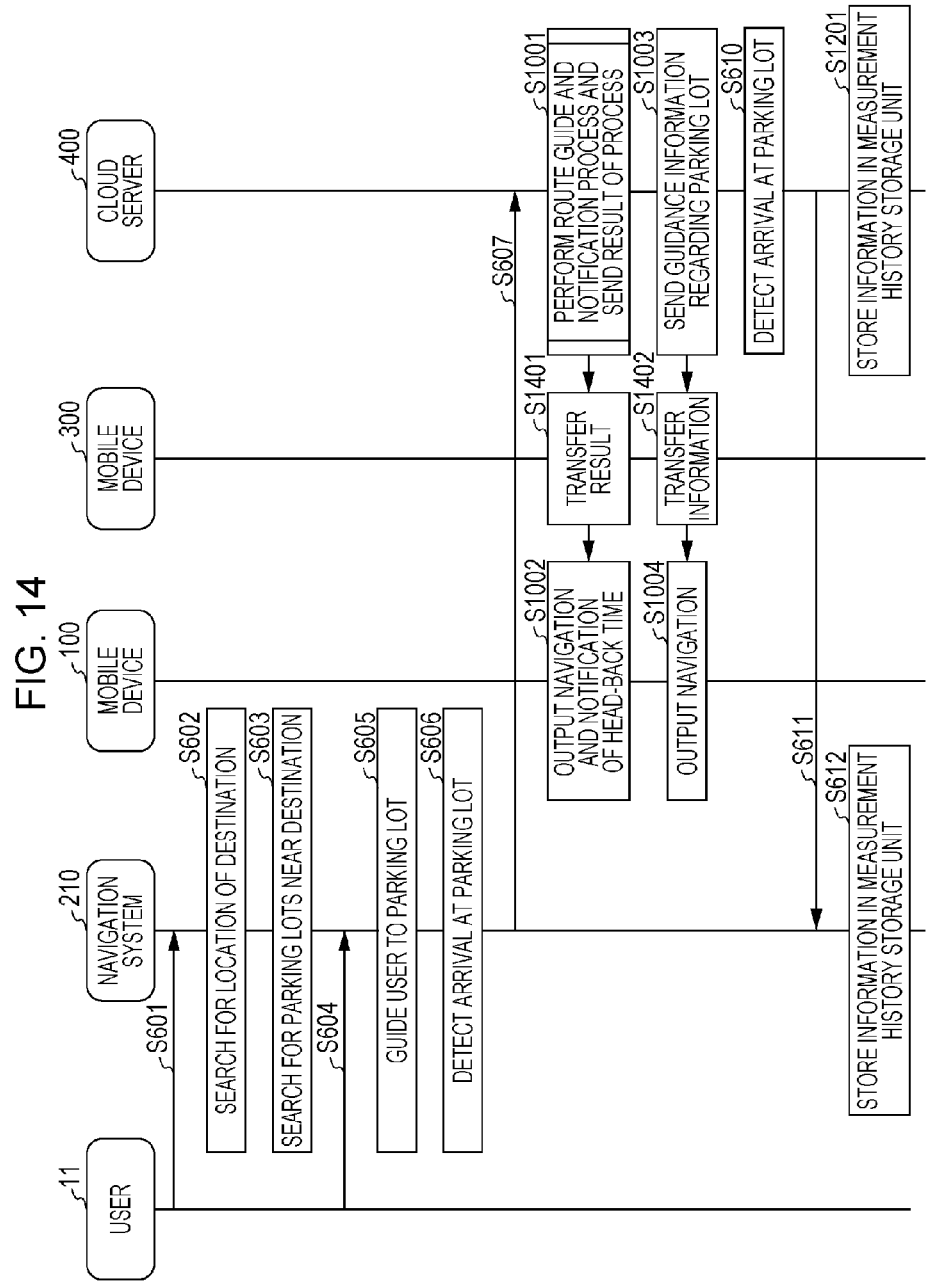
FIG. 14 is a sequence diagram schematically illustrating the operation performed by the information notification system illustrated in FIG. 13 according to the fourth exemplary embodiment.

FIG. 14 is a sequence diagram schematically illustrating the operation performed by the information notification system 4 illustrated in FIG. 13 according to the fourth exemplary embodiment. Like the operation illustrated in FIG. 6 according to the first exemplary embodiment, the operation illustrated in FIG. 14 starts when the user 11 drives the vehicle 200 and leaves home. Note the same numbering will be used in referring to FIG. 14 as is utilized above in describing the first to third exemplary embodiments and, thus, detailed description of the process is not repeated.

In steps S601 to S607, the processes that are the same as in the first exemplary embodiment (steps S601 to S607 in FIG. 6) are performed. Note that unlike the first exemplary embodiment (step S607 in FIG. 6), in step S607, the information regarding the destination 12 and the attribute information regarding the parking lot 13 are sent to the communication unit 401 of the cloud server 400.

In steps S1001 to S1004 subsequent to step S607, the processes that are the same as those in the third exemplary embodiment (steps S1001 to S1004 in FIG. 12) are performed. Note that, in steps S1001 and S1003 illustrated in FIG. 12 according to the third exemplary embodiment, the cloud server 400 directly sends the result of processing to the mobile device 100.

In contrast, in step S1001 of the fourth exemplary embodiment, the communication unit 401 of the cloud server 400 sends the result of processing to the communication unit 311 of the mobile device 300. Thereafter, the communication unit 302 of the mobile device 300 transfers the result of processing received by the communication unit 311 to the communication unit 101 of the mobile device 100 (step S1401).

In addition, in step S1003 of the fourth exemplary embodiment, the communication unit 401 of the cloud server 400 sends the guidance information regarding the parking lot to the communication unit 311 of the mobile device 300. Thereafter, the communication unit 302 of the mobile device 300 transfers the guidance information regarding the parking lot received by the communication unit 311 to the communication unit 101 of the mobile device 100 (step S1402).

In the subsequent steps S610 to S612, the processes that are the same as those of the first exemplary embodiment (steps S610 to S612 in FIG. 6) are performed, although the processes in steps S610 and S611 are performed by the cloud server 400. In addition, in step S1201, the process that is the same as that in the third exemplary embodiment (step S1201 in FIG. 12) is performed.

As described above, according to the fourth exemplary embodiment, the information notification system 4 performs an operation that is similar to that of the information notification system 1 according to the first exemplary embodiment. As a result, like the first exemplary embodiment, according to the fourth exemplary embodiment, the user 11 can be reminded of their departure.

In the information notification system 4 according to the fourth exemplary embodiment, since the heavy load processes are performed by the cloud server 400, the processing load imposed on the mobile device 100 can be reduced. Thus, according to the fourth exemplary embodiment, the mobile device 100 can reduce power consumption from that in the first exemplary embodiment. As a result, according to the fourth exemplary embodiment, the run time of a battery, which is a power source of the mobile device 100, can be increased more than in the first exemplary embodiment.

Modification of Fourth Exemplary Embodiment (1) In the operation illustrated in FIG. 14, like the first exemplary embodiment, the time required for the user 11 to move from the destination 12 to the parking lot 13 is considered to be the same as the travel time Tm required for the user 11 to actually move from the parking lot 13 to the destination 12, and the remaining time Tr is calculated in step S1001. That is, the remaining time measurement unit 105 calculates the remaining time Tr using the above-described equation (1). However, the calculation in the fourth exemplary embodiment is not limited thereto.

FIG. 15 illustrates an example of the data structure of history information 1500 stored in the measurement history storage unit 402 in step S1201 of FIG. 14. The history information 1500 stored in the measurement history storage unit 402 is described below with reference to FIGS. 13 and 15.

As illustrated in FIG. 15, the history information 1500 includes a day of week 1501, a time zone 1502, weather 1503, a travel speed 1504, a travel time 1505.

As illustrated in FIG. 13, the travel speed calculation unit 411 of the cloud server 400 calculates the travel speed of the user moving from the destination 12 to the parking lot 13 on the basis of the information received from the navigation unit 102. The travel speed calculation unit 411 associates the calculated travel speed 1504 with the measured travel time 1505 and stores, as the history information 1500, the travel speed 1504 and the travel time 1505 in the measurement history storage unit 402.

The mobile device 100 or the mobile device 300 may have a GPS function. The mobile device 100 or the mobile device 300 may send, to the cloud server 400, the information regarding the location of the user 11 detected by the GPS function. The travel speed calculation unit 411 may calculate the travel speed of the user 11 moving from the destination 12 to the parking lot 13 on the basis of the elapsed time obtained from the clock unit 107 and the moving distance obtained from the information regarding the location of the user 11 sent from the mobile device 100 or the mobile device 300.

When the process in step S1201 of FIG. 14 is performed, the environment information acquiring unit 412 obtains the current date and time from the clock unit 107 (an example of a third obtaining step). The environment information acquiring unit 412 retrieves the day of week and the time zone from the obtained date and time. The environment information acquiring unit 412 associates the retrieved day of week 1501 and time zone 1502 with the measured travel time 1505 and stores, as the history information 1500, the day of week 1501, the time zone 1502, and the travel time 1505 in the measurement history storage unit 402.

When the process in step S1201 of FIG. 14 is performed, the environment information acquiring unit 412 further acquires the information regarding the weather around the destination 12 via, for example, the Internet. The environment information acquiring unit 412 associates the weather 1503 obtained from the information regarding the weather with the measured travel time 1505 and stores, as the history information 1500, the weather 1503 and the travel time 1505 in the measurement history storage unit 402.

As illustrated in FIG. 15, the history information 1500 regarding each of a plurality of users is stored in the measurement history storage unit 402 for each of pairs consisting of a destination and a parking lot.

When the user 11 is moving from the parking lot 13 to the destination 12, the travel speed calculation unit 411 uses the GPS function of the mobile device 100 or the mobile device 300 to calculate the travel speed of the user 11 from, for example, a moving distance of the user 11 per minute (an example of a speed calculation step). When the user 11 is moving from the parking lot 13 to the destination 12, the environment information acquiring unit 412 acquires the current day of week and time zone using the clock unit 107 and further acquires the information regarding the current weather via, for example, the Internet.

The measurement history search unit 413 searches the measurement history storage unit 402 for the history information 1500 corresponding to the pair consisting of the destination 12 and the parking lot 13 between which the user 11 is currently moving. The measurement history search unit 413 extracts, from the found history information 1500, the travel time associated with the travel speed of the user 11, the current weather, and the current day of week and time zone.

The remaining time measurement unit 105 calculates the remaining time Tr during which the user 11 can stay at the destination 12 as follows:

$$Tr = Tp - (Tm + Th) - Ts \qquad (2)$$

where Th is the travel time extracted by the measurement history search unit 413.

As can be seen from the above-described equation (2), according to the modification of the fourth exemplary embodiment, the value obtained by summing the travel time Th actually required when the user 11 moved at the same speed in the same day of week and time zone under the same weather condition in the past and the travel time Tm is defined as the round trip time between the destination 12 and the parking lot 13.

The levels of congestion in a route from the destination 12 to the parking lot 13 are similar to each other in the same day of week and time zone. Accordingly, it is highly likely that the user 11 can move at the same travel speed. In addition, under the same weather conditions, the levels of difficulty of movement are similar to each other. Accordingly, it is highly likely that the user 11 can move at the same travel speed. Thus, according to the modification of the fourth exemplary embodiment, the remaining time Tr can be accurately calculated.

Note that in the operation illustrated in FIG. 14, the remaining time measurement unit 105 calculates the remaining time Tr using the above-described equation (1). In such a case, the cloud server 400 according to the fourth exemplary embodiment need not include the travel speed calculation unit 411, the environment information acquiring unit 412, and the measurement history search unit 413.

(2) Like the first exemplary embodiment, in the operation illustrated in FIG. 14, a prior notification is provided in step S1002 if the remaining time Tr reaches the threshold value Tth. That is, only one prior notification is provided before the remaining time Tr reaches zero. However, according to the fourth exemplary embodiment, the number of prior notifications is not limited to one.

As illustrated in FIG. 13, like the first exemplary embodiment, the navigation system 210 holds the parking lot attribute information. The parking lot attribute information includes the information indicating whether the user 11 violates the traffic regulations if the duration of parking at the parking lot exceeds a parking time limit Tp. The navigation unit 102 of the cloud server 400 holds the parking lot attribute information sent from the navigation system 210.

The parking lot determination unit 414 of the cloud server 400 acquires the parking lot attribute information from the navigation unit 102 (an example of a fourth obtaining step). The parking lot determination unit 414 determines whether the user 11 violates the traffic regulations if the duration of parking at the parking lot 13 exceeds a parking time limit Tp.

For example, in Japan, the parking lot determination unit 414 determines whether the parking lot 13 is an on-street parking space within the designated parking meter zone. Alternatively, for example, in the United Kingdom, the parking lot determination unit 414 determines whether the parking lot 13 is a public parking. In the above-described parking space and public parking, the user 11 violates the traffic regulations if the duration of parking exceeds the parking time limit.

The notification frequency determination unit 415 determines the frequency of prior notification (the number of prior notifications) of the remaining time Tr provided by the head-back notification unit 106 on the basis of the result of determination made by the parking lot determination unit 414 (an example of a determination step). If the parking lot determination unit 414 determines that the user 11 violates the traffic regulations if the duration of parking exceeds the parking time limit Tp, the notification frequency determination unit 415 increases the frequency of prior notification.

For example, the notification frequency determination unit 415 determines that two prior notifications are provided to the user 11. That is, a first prior notification is provided if the remaining time Tr reaches a first threshold value Tth1 (e.g., Tth1=10 minutes), and a second prior notification is provided if the remaining time Tr reaches a second threshold value Tth2 (Tth2>Tth1 (e.g., Tth2=20 minutes)). Note that the number of prior notifications is not limited to two. For example, the notification frequency determination unit 415 may set three or more threshold values and may determine that it provides three or more prior notifications.

The head-back notification unit 106 instructs the head-back output unit 122 of the mobile device 100 to provide prior notifications equal in number to the number determined by the notification frequency determination unit 415. In this manner, according to the modification of the fourth exemplary embodiment, by increasing the frequency of prior notification provided to the user 11, a plurality of alerts can be provided to the user 11 so that the user 11 does not violate the traffic regulations.

Note that as in the case where the remaining time Tr reaches the threshold value Tth in the first exemplary embodiment illustrated in FIG. 4, the notification unit may instruct the head-back output unit 122 to display the notification screen 40 on the display 108 (an example of a first device) when the remaining time Tr reaches the first threshold value Tth1 and when the remaining time Tr reaches the second threshold value Tth2. In this manner, the notification unit may provide prior notifications to the user 11.

Alternatively, the head-back notification unit 106 may instruct the head-back output unit 122 to provide prior notification to the user 11 without using the display 108 when the remaining time Tr reaches the first threshold value Tth1 and when the remaining time Tr reaches the second threshold value Tth2. More specifically, the head-back notification unit 106 may instruct the head-back output unit 122 to provide prior notification to the user 11 using a notification technique without the display 108 illustrated in FIG. 5, that is, using at least one of the notification 51 using sound output from the speaker 109 (an example of a second device), the notification 52 using music, the notification 53 using a speech, the notification 54 using the vibration unit 111 (an example of the second device).

When the frequency of prior notification to the user 11 is increased and if all the notifications are provided using the display 108, power consumption is significantly increased. Accordingly, the life of battery serving as a power source of the mobile device 100 significantly decreases and, thus, the battery needs to be charged in a short period.

In contrast, by providing prior notification to the user 11 using the speaker 109 or the vibration unit 111 instead of the display 108, a significant increase in power consumption can be prevented. As a result, a significant decrease in the life of the battery serving as a power source of the mobile device 100 can be prevented.

Note that like the first exemplary embodiment, in the operation illustrated in FIG. 14, when the remaining time Tr reaches the threshold value Tth, the prior notification is provided in step S1002. That is, only one prior notification is provided before the remaining time Tr reaches zero. In such a case, the cloud server 400 according to the fourth exemplary embodiment need not include the parking lot determination unit 414 and the notification frequency determination unit 415.

Others (1) According to the above-described first exemplary embodiment, the navigation system 210 holds the parking lot attribute information including the parking time limit. Accordingly, the mobile device 100 acquires the parking time limit from the navigation system 210. However, the present disclosure is not limited to such a process.

FIGS. 16 to 19 are sequence diagrams schematically illustrating different examples of the procedure for the mobile device 100 to acquire the parking time limit in the first exemplary embodiment.

Figure 16:
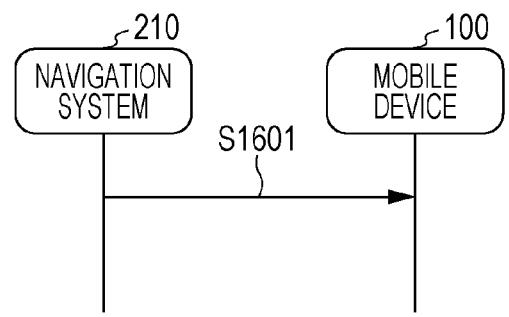
FIG. 16 is a sequence diagram schematically illustrating an example of the procedure for acquisition of a parking time limit performed by a mobile device according to the first exemplary embodiment.

FIG. 16 illustrates an example of the first exemplary embodiment in which the navigation system 210 holds the parking time limit. In step S1601 of FIG. 16, the navigation system 210 sends the parking time limit stored therein to the mobile device 100. That is, the process performed in step S1601 illustrated in FIG. 16 is the same as that in step S607 illustrated in FIG. 6.

Figure 17:
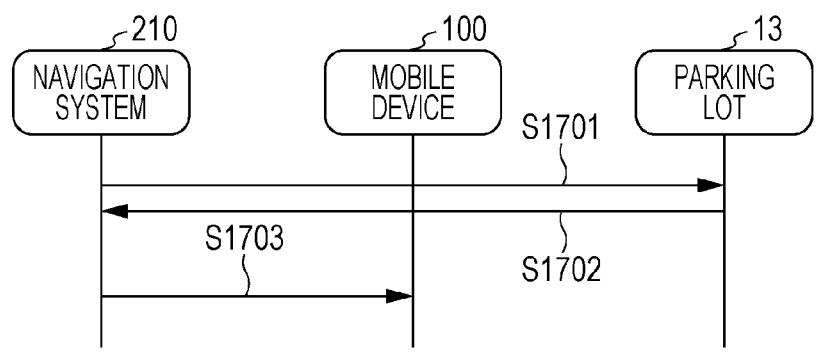
FIG. 17 is a sequence diagram schematically illustrating an example of the procedure for acquisition of a parking time limit performed by a mobile device according to the first exemplary embodiment.

FIG. 17 illustrates an example in which the gate or the ticket machine of the parking lot 13 holds the parking time limit. In step S1701 of FIG. 17, the navigation system 210 sends, to the gate or the ticket machine of the parking lot 13, an acquisition request for the parking time limit. In step S1702, the gate or the ticket machine of the parking lot 13 sends the parking time limit to the navigation system 210. In step S1703, the navigation system 210 sends the acquired parking time limit to the mobile device 100. Note that in FIG. 17, the mobile device 100 may perform near field communication with the gate or the ticket machine of the parking lot 13 to directly receive the parking time limit.

Figure 18:
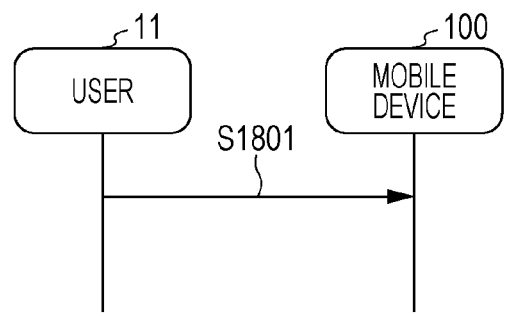
FIG. 18 is a sequence diagram schematically illustrating an example of the procedure for acquisition of a parking time limit performed by a mobile device according to the first exemplary embodiment.

FIG. 18 illustrates an example in which the user 11 sets the parking time limit. In step S1801 of FIG. 18, the user 11 operates the mobile device 100 to set the parking time limit. Note that in FIG. 18, the user 11 may operate the navigation system 210 to set the parking time limit. The navigation system 210 may send the set parking time limit to the mobile device 100.

Figure 19:
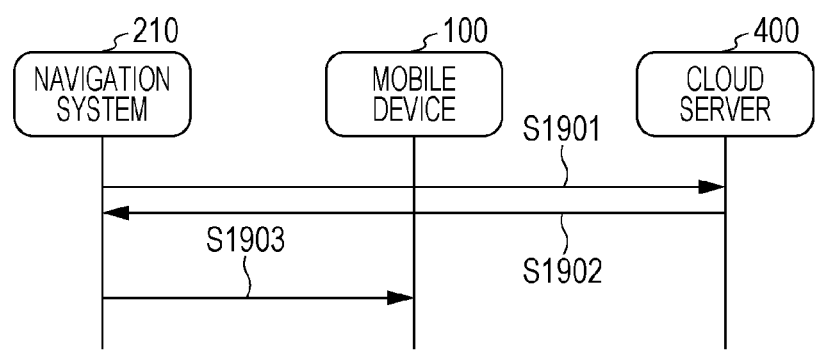
FIG. 19 is a sequence diagram schematically illustrating an example of the procedure for acquisition of a parking time limit performed by a mobile device according to the first exemplary embodiment.

FIG. 19, illustrates an example in which the cloud server 400 holds the parking time limit. That is, in FIG. 19, the information notification system 1 according to the first exemplary embodiment further includes the cloud server 400. In addition, the navigation system 210 is configured so as to communicate with the cloud server 400 via a mobile telephone network or the Internet.

In step S1901 of FIG. 19, the navigation system 210 sends, to the cloud server 400, an acquisition request for the parking time limit. The acquisition request includes a parking lot ID for identifying the parking lot 13. In step S1902, the cloud server 400 searches for the parking time limit corresponding to the parking lot ID and sends the found parking time limit to the navigation system 210. In step S1903, the navigation system 210 sends the acquired parking time limit to the mobile device 100. Note that in FIG. 19, the mobile device 100 may communicate with the cloud server 400 and directly acquire the parking time limit.

(2) In the above-described exemplary embodiments, the parking time limit of the parking lot 13 is fixed. However, the parking time limit of the present disclosure is not limited thereto. For example, the present disclosure is applicable to a parking lot requiring a parking fee that increases with increasing parking time, like a parking lot provided in a shopping mall. In such a case, the notification "The parking fee does not increase if you leave the destination 12 right away" can be provided to the user 11.

(3) In the third and fourth exemplary embodiment, the cloud server 400 includes the measurement history storage unit 402. Accordingly, in the third and fourth exemplary embodiment, the navigation system 210 need not include the measurement history storage unit 211.

The information notification method, the information notification system, and the recording medium according to the present disclosure are applicable to a technology for notifying a user who parks their vehicle at a parking lot and, thereafter, stays at their destination of information, such as information regarding a time at which a user must leave for the parking lot.

What is claimed is:
1. An information notification system comprising:
a navigation system mounted in a vehicle, the navigation system guiding a user to a destination and a parking lot; and
a mobile device carried by the user and capable of communicating with the navigation system and a cloud server,
wherein the cloud server includes a first non-transitory recording medium storing a measured length of time associated with day of week, time zone and weather, the measured length of time being time during which at least one of the user or a person other than the user previously moved from the destination to the parking lot, the cloud server performs:
obtaining a parking time limit during which the user is allowed to continuously park the vehicle at the parking lot,
measuring a travel time required for the user to move from the parking lot to the destination,
obtaining day of week, time zone and weather when the user moves from the parking lot to the destination,
obtaining the measured length of time stored in the first non-transitory recording medium using the obtained day of week, the obtained time zone and the obtained weather,
obtaining a round trip time required for the user to make a round trip between the destination and the parking lot by summing the travel time and the obtained measured length of time,
calculating a remaining time during which the user is allowed to stay at the destination by subtracting, from the parking time limit, the round trip time and an elapsed time measured from when the user has reached the destination, and
obtaining attribute information indicating whether or not the user violates a traffic regulation when parking duration at the parking lot exceeds the parking time limit,
wherein the attribute information indicates whether or not the parking lot is a public parking to indicate whether or not the user violates the traffic regulation when parking duration at the parking lot exceeds the parking time limit for the parking lot, and
it is determined that the user violates the traffic regulation when parking duration at the parking lot exceeds the parking time limit for the parking lot, by determining that the attribute information indicates that the parking lot is the public parking,
when it is determined, based on the attribute information, that the user violates the traffic regulation when parking duration at the parking lot exceeds the parking time limit,
determining whether the remaining time is less than or equal to a first threshold value,
notifying the user, using the mobile device, that the remaining time is short, upon determining that the remaining time is less than or equal to the first threshold value,
determining whether the remaining time is less than or equal to a second threshold value, and
notifying the user, using the mobile device, that the remaining time is short, upon determining that the remaining time is less than or equal to the second threshold value, the second threshold value is smaller than the first threshold value.

2. A non-transitory computer-readable recording medium storing a computer program for use in an information notification system including a cloud server, a navigation system mounted in a vehicle and a mobile device of a user, the mobile device guiding the user to a destination and a parking lot, the mobile device being capable of communicating with the cloud server, the computer program causes the cloud server to perform:
storing, in a storage of the cloud server, a measured length of time associated with day of week, time zone and weather, the measured length of time being time during which at least one of the user or a person other than the user previously moved from the destination to the parking lot,
obtaining a parking time limit during which the user is allowed to continuously park the vehicle at the parking lot;
measuring a travel time required for the user to move from the parking lot to the destination;
obtaining day of week, time zone and weather when the user moves from the parking lot to the destination;

obtaining the measured length of time stored in the storage using the obtained day of week, the obtained time zone and the obtained weather;

obtaining a round trip time required for the user to make a round trip between the destination and the parking lot by summing the travel time and the obtained measured length of time;

calculating a remaining time during which the user is allowed to stay at the destination by subtracting, from the parking time limit, the round trip time and an elapsed time measured from when the user has reached the destination; and obtaining attribute information indicating whether or not the user violates a traffic regulation when parking duration at the parking lot exceeds the parking time limit, wherein the attribute information indicates whether or not the parking lot is a public parking to indicate whether or not the user violates the traffic regulation when parking duration at the parking lot exceeds the parking time limit for the parking lot, and it is determined that the user violates the traffic regulation when parking duration at the parking lot exceeds the parking time limit for the parking lot, by determining that the attribute information indicates that the parking lot is the public parking, when it is determined, based on the attribute information, that the user violates the traffic regulation when parking duration at the parking lot exceeds the parking time limit, determining whether the remaining time is less than or equal to a first threshold value, notifying the user, using the mobile device, that the remaining time is short, upon determining that the remaining time is less than or equal to the first threshold value, determining whether the remaining time is less than or equal to a second threshold value, and notifying the user, using the mobile device, that the remaining time is short, upon determining that the remaining time is less than or equal to the second threshold value, the second threshold value is smaller than the first threshold value.

* * * * *